(12) United States Patent
Aisu et al.

(10) Patent No.: US 8,769,698 B2
(45) Date of Patent: Jul. 1, 2014

(54) APPARATUS AND METHOD FOR PLAYBACK OF DIGITAL CONTENT

(75) Inventors: Hideyuki Aisu, Kawasaki (JP); Satoshi Ito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1257 days.

(21) Appl. No.: 11/661,365

(22) PCT Filed: Jan. 5, 2007

(86) PCT No.: PCT/JP2007/050363
§ 371 (c)(1),
(2), (4) Date: Nov. 18, 2008

(87) PCT Pub. No.: WO2007/078010
PCT Pub. Date: Jul. 12, 2007

(65) Prior Publication Data
US 2009/0083856 A1    Mar. 26, 2009

(30) Foreign Application Priority Data

Jan. 5, 2006   (JP) ................................ 2006-000558
Mar. 16, 2006  (JP) ................................ 2006-072678

(51) Int. Cl.
*G06F 21/00*       (2013.01)
(52) U.S. Cl.
USPC .................................. 726/26; 726/27; 726/30
(58) Field of Classification Search
USPC ................. 726/1, 26; 369/30.9; 707/999.104, 707/999.107
See application file for complete search history.

(56) References Cited

U.S. PATENT DOCUMENTS

| 5,138,712 A | 8/1992 | Corbin |
| 5,629,980 A | 5/1997 | Stefik et al. |
| 5,659,539 A | 8/1997 | Porter et al. |
| 5,659,793 A | 8/1997 | Escobar et al. |

(Continued)

FOREIGN PATENT DOCUMENTS

| CN | 1487456 | 4/2004 |
| EP | 0 878 796 | 11/1998 |

(Continued)

OTHER PUBLICATIONS

Cheng-Ching Huang et al, Department of Electronics Engineering, National Chiao-Tung University, Hsinchu, Taiwan. "MPEG IPMP Concepts and Implementation" Advances in Multimedia Information Processing—PCM 2002, pp. 344-352, Springer-Verlag, Dec. 2002.*

(Continued)

*Primary Examiner* — Jason Lee
(74) *Attorney, Agent, or Firm* — Nixon & Vanderhye, P.C.

(57) ABSTRACT

There is provided with a digital content playback apparatus which generates new digital content by replacing a content part in digital content by an other content parts, including: a storage to store license conditions defined for the content parts in the digital content, each of which includes at least a replacement permission condition and a replacement target specification condition, a specifying unit configured to allow a user to specify a replacement source content part as a content part to be replaced, and a replacement target content part as a content part for adding to the digital content for replacing the replacement source content part, and a verifying unit to verify whether license conditions of content parts in the digital content and the replacement target content part would be satisfied when replacing the replacement source content part in the digital content by the replacement target content part.

13 Claims, 27 Drawing Sheets

(56) References Cited

U.S. PATENT DOCUMENTS

| | | |
|---|---|---|
| 5,712,713 A | 1/1998 | Hamanaka et al. |
| 5,715,403 A | 2/1998 | Stefik |
| 5,724,605 A | 3/1998 | Wissner |
| 5,745,645 A | 4/1998 | Nakamura et al. |
| 5,752,029 A | 5/1998 | Wissner |
| 5,754,657 A | 5/1998 | Schipper et al. |
| 5,754,851 A | 5/1998 | Wissner |
| 5,765,152 A | 6/1998 | Erickson |
| 5,826,102 A | 10/1998 | Escobar et al. |
| 5,864,682 A | 1/1999 | Porter et al. |
| 5,892,900 A | 4/1999 | Ginter et al. |
| 5,900,608 A | 5/1999 | Iida |
| 5,917,912 A | 6/1999 | Ginter et al. |
| 5,923,869 A | 7/1999 | Kashiwagi et al. |
| 5,991,444 A | 11/1999 | Burt et al. |
| 6,006,242 A | 12/1999 | Poole et al. |
| 6,025,853 A | 2/2000 | Baldwin |
| 6,029,182 A | 2/2000 | Nehab et al. |
| 6,034,832 A | 3/2000 | Ichimura et al. |
| 6,064,796 A | 5/2000 | Nakamura et al. |
| 6,097,814 A | 8/2000 | Mochizuki |
| 6,097,877 A | 8/2000 | Katayama et al. |
| 6,154,207 A | 11/2000 | Farris et al. |
| 6,154,223 A | 11/2000 | Baldwin |
| 6,209,787 B1 | 4/2001 | Iida |
| 6,223,347 B1 | 4/2001 | Watanabe |
| 6,226,618 B1 | 5/2001 | Downs et al. |
| 6,240,185 B1 | 5/2001 | Van Wie et al. |
| 6,253,193 B1 | 6/2001 | Ginter et al. |
| 6,263,335 B1 | 7/2001 | Paik et al. |
| 6,278,448 B1 | 8/2001 | Brown et al. |
| 6,327,628 B1 | 12/2001 | Anuff et al. |
| 6,363,488 B1 | 3/2002 | Ginter et al. |
| 6,389,402 B1 | 5/2002 | Ginter et al. |
| 6,397,231 B1 | 5/2002 | Salisbury et al. |
| 6,427,140 B1 | 7/2002 | Ginter et al. |
| 6,429,879 B1 | 8/2002 | Sturgeon et al. |
| 6,445,795 B1 | 9/2002 | Sako et al. |
| 6,449,627 B1 | 9/2002 | Baer et al. |
| 6,460,023 B1 | 10/2002 | Bean et al. |
| 6,477,341 B2 | 11/2002 | Komura et al. |
| 6,477,649 B2 | 11/2002 | Kambayashi et al. |
| 6,507,410 B1 | 1/2003 | Robertson et al. |
| 6,535,919 B1 | 3/2003 | Inoue et al. |
| 6,587,837 B1 | 7/2003 | Spagna et al. |
| 6,611,812 B2 | 8/2003 | Hurtado et al. |
| 6,658,568 B1 | 12/2003 | Ginter et al. |
| 6,681,015 B1 | 1/2004 | Hioki et al. |
| 6,766,946 B2 | 7/2004 | Iida |
| 6,832,319 B1 | 12/2004 | Bell et al. |
| 6,873,975 B1 | 3/2005 | Hatakeyama et al. |
| 6,876,984 B2 | 4/2005 | Tadayon et al. |
| 6,907,184 B1 | 6/2005 | Yokota et al. |
| 6,942,143 B1 | 9/2005 | Iida |
| 6,948,070 B1 | 9/2005 | Ginter et al. |
| 6,980,984 B1 | 12/2005 | Huffman et al. |
| 7,032,819 B2 | 4/2006 | Iida |
| 7,035,826 B2 | 4/2006 | Hamada et al. |
| 7,043,454 B2 | 5/2006 | Powell |
| 7,047,241 B1 | 5/2006 | Erickson |
| 7,051,212 B2 | 5/2006 | Ginter et al. |
| 7,073,073 B1 | 7/2006 | Nonaka et al. |
| 7,076,652 B2 | 7/2006 | Ginter et al. |
| 7,124,443 B2 | 10/2006 | Ishibashi et al. |
| 7,143,067 B1 | 11/2006 | Cheston et al. |
| 7,159,244 B2 | 1/2007 | Matsushima et al. |
| 7,178,144 B2 | 2/2007 | Melchione et al. |
| 7,188,224 B2 | 3/2007 | Ohta et al. |
| 7,213,005 B2 | 5/2007 | Mourad et al. |
| 7,213,268 B2 | 5/2007 | Stelling et al. |
| 7,237,123 B2 | 6/2007 | LeVine et al. |
| 7,260,721 B2 | 8/2007 | Tanaka et al. |
| 7,328,453 B2 | 2/2008 | Merkle et al. |
| 7,336,787 B2 | 2/2008 | Unger et al. |
| 7,376,624 B2 | 5/2008 | Cochran et al. |
| 7,428,512 B2 | 9/2008 | Nozaki et al. |
| 7,467,100 B2 | 12/2008 | Matsumori et al. |
| 7,490,068 B2 | 2/2009 | Ito et al. |
| 7,497,351 B2 | 3/2009 | Iida |
| 7,497,381 B2 | 3/2009 | Iida |
| 7,552,093 B2 | 6/2009 | Levin et al. |
| 7,558,759 B2 | 7/2009 | Valenzuela et al. |
| 7,565,697 B2 | 7/2009 | LeVine et al. |
| 7,587,368 B2 | 9/2009 | Felsher |
| 7,607,017 B2 | 10/2009 | Pelly et al. |
| 7,702,101 B2 | 4/2010 | Malcolm et al. |
| 7,801,825 B2 | 9/2010 | Kranzley et al. |
| 7,836,311 B2 | 11/2010 | Kuriya et al. |
| 7,904,390 B2 | 3/2011 | Yui |
| 7,934,263 B2 | 4/2011 | Singer et al. |
| 8,027,936 B2 | 9/2011 | Ito |
| 8,090,619 B1 | 1/2012 | Hunter et al. |
| 8,266,061 B2 | 9/2012 | Ito et al. |
| 2001/0000191 A1 | 4/2001 | Barkan et al. |
| 2001/0032189 A1 | 10/2001 | Powell |
| 2002/0038451 A1 | 3/2002 | Tanner et al. |
| 2002/0040435 A1 | 4/2002 | Hamada et al. |
| 2002/0077986 A1 | 6/2002 | Kobata et al. |
| 2002/0078105 A1 | 6/2002 | Hamada et al. |
| 2002/0083324 A1 | 6/2002 | Hirai |
| 2002/0092021 A1 | 7/2002 | Yap et al. |
| 2002/0107809 A1 | 8/2002 | Biddle et al. |
| 2002/0114466 A1 | 8/2002 | Tanaka et al. |
| 2002/0138557 A1 | 9/2002 | Mukaiyama et al. |
| 2002/0152171 A1 | 10/2002 | Okamoto et al. |
| 2002/0161830 A1 | 10/2002 | Mukaiyama et al. |
| 2002/0161831 A1 | 10/2002 | Nakaoka et al. |
| 2002/0184517 A1 | 12/2002 | Tadayon et al. |
| 2002/0186408 A1 | 12/2002 | Nakaoka et al. |
| 2002/0194267 A1 | 12/2002 | Flesner et al. |
| 2002/0196273 A1 | 12/2002 | Krause |
| 2003/0004888 A1 | 1/2003 | Kambayashi et al. |
| 2003/0028489 A1 | 2/2003 | Williamson |
| 2003/0060910 A1 | 3/2003 | Williams et al. |
| 2003/0084341 A1 | 5/2003 | Ramachandran et al. |
| 2003/0103647 A1 | 6/2003 | Rui et al. |
| 2003/0125976 A1 | 7/2003 | Nguyen et al. |
| 2003/0154378 A1 | 8/2003 | Hirano |
| 2003/0154387 A1 | 8/2003 | Evans et al. |
| 2003/0215217 A1 | 11/2003 | Hori et al. |
| 2003/0225784 A1 | 12/2003 | Kim et al. |
| 2004/0025058 A1 | 2/2004 | Kuriya et al. |
| 2004/0027931 A1* | 2/2004 | Morita ...................... 369/30.09 |
| 2004/0093337 A1* | 5/2004 | Shen et al. ................... 707/100 |
| 2004/0103303 A1 | 5/2004 | Yamauchi et al. |
| 2004/0105544 A1 | 6/2004 | Haneda et al. |
| 2004/0117619 A1 | 6/2004 | Singer et al. |
| 2004/0210765 A1 | 10/2004 | Erickson |
| 2004/0220881 A1 | 11/2004 | Powell |
| 2005/0065867 A1 | 3/2005 | Aisu et al. |
| 2005/0125358 A1 | 6/2005 | Levin et al. |
| 2005/0125359 A1 | 6/2005 | Levin et al. |
| 2005/0152672 A1 | 7/2005 | Kanai et al. |
| 2006/0004669 A1 | 1/2006 | Ito |
| 2006/0021068 A1* | 1/2006 | Xu et al. ......................... 726/30 |
| 2006/0080262 A1 | 4/2006 | Ito et al. |
| 2006/0095974 A1 | 5/2006 | Ito et al. |
| 2006/0130121 A1* | 6/2006 | Candelore et al. ............ 725/145 |
| 2007/0136113 A1 | 6/2007 | Wilson |
| 2007/0255660 A1 | 11/2007 | Tanaka |
| 2008/0064326 A1 | 3/2008 | Foster et al. |
| 2009/0216769 A1 | 8/2009 | Bellwood et al. |
| 2009/0296929 A1 | 12/2009 | Wachtfogel et al. |
| 2010/0226525 A1 | 9/2010 | Levy et al. |

FOREIGN PATENT DOCUMENTS

| | | |
|---|---|---|
| EP | 1 359 508 | 11/2003 |
| EP | 1 408 499 | 4/2004 |
| EP | 1 457 886 | 9/2004 |
| EP | 1 594 137 | 11/2005 |
| JP | 11-185381 | 7/1999 |
| JP | 2000-113066 | 4/2000 |
| JP | 2001-282948 | 10/2001 |

(56) References Cited

FOREIGN PATENT DOCUMENTS

| JP | 2001-521234 | 11/2001 |
|---|---|---|
| JP | 2001-525951 | 12/2001 |
| JP | 2002-41966 | 2/2002 |
| JP | 2002-109103 | 4/2002 |
| JP | 2002-203119 | 7/2002 |
| JP | 2004-005939 | 1/2004 |
| JP | 2004-13493 | 1/2004 |
| JP | 2004-70646 | 3/2004 |
| JP | 2005-353196 | 12/2005 |
| WO | 97/21183 | 6/1997 |
| WO | WO 0052583 A1 * | 9/2000 |
| WO | 03/052603 | 6/2003 |
| WO | 2005/022537 | 3/2005 |

OTHER PUBLICATIONS

Digital Rights Management and Watermarking of Multimedia Content for M-Commerce Applications; Hartung et al, IEEE Nov. 2000 7 pages.*
International Standard, ISO/IEC 21000-2, Information technology—Multimedia Framework (MPEG-21)—Part 2: Digital Item Declaration, 2003, cover plus pp. ii-viii and 1-37.
International Standard, ISO/IEC 21000-5, Information technology—Multimedia Framework (MPEG-21)—Part 5: Rights Expression Language, 2004, cover plus pp. 1-59.
Advanced Access Content System (AACS), *Introduction and Common Cryptographic Elements*, preliminary draft, revision 0.90, Apr. 14, 2005, cover plus pp. 40-55.
"Unknown"; "First Look: Apple iTunes 4.9 Podcast Support"; http://www.podcastingnews.com/archives/2005/06/first_look_appl.html ; Jun. 29, 2005; XP-002429458.
International Search Report App. No. PCT/JP2007/050363, dated Jan. 5, 2007.
"Information technology—Multimedia framework (MPEG-21)—Part 5: Right Expression Language", ISO/IEC 21000-5, First edition, Apr. 1, 2004, pp. 1-121.
"Information technology—Multimedia framework (MPEG-21)—Part 2: Digital Item Declaration", ISO/IEC 21000-2, First edition, Mar. 15, 2003, pp. 1-37.
"Advanced Access Content System (AACS), Introduction and Common Cryptographic Elements", Preliminary Draft, Revision 0.90, Apr. 14, 2005, pp. 40-55.
"Apple iTunes 4.9"; Retrieved from http://www.zdnet.fr/produits/imprimer/0,50000168,39251533m00.htm ; XP002429617; Aug. 15, 2005.
"Publish a Podcast", http://web.archive.org/web/20051231042944/http://podcasts.yahoo ; XP-002429676.
Office Action dated Dec. 14, 2012 in EP Application No. 07706705.6.
Ito et al., U.S. Appl. No. 11/075,426, filed Mar. 9, 2005.
Ito et al., U.S. Appl. No. 11/076,538, filed Mar. 10, 2005.
Office Action dated Jan. 19, 2010 in JP App. 2006-072678 and English-language translation thereof.

* cited by examiner

| REPLACEMENT SOURCE VIDEO OBJECT ID | REPLACEMENT TARGET VIDEO OBJECT CANDIDATE ID | REPLACEMENT TARGET VIDEO OBJECT ID |
|---|---|---|
| 103 | 1003, 1103 | 103 |
| 104 | 1004, 1104 | 104 |
| 107 | 1007, 1107 | 1007 |
| 108 | 1008, 1108 | 1008 |
| 203 | 2003 | 203 |
| 204 | 2004 | 204 |
| 207 | 2007 | 2007 |
| 208 | 2008 | 2008 |

1003 ADDITION FAILS

```
<playlist  Name= "001" >
<seq>
    <vo src= "file:///dvddisc/ADV_OBJ/Vo1" />
    <vo src= "file:///dvddisc/ADV_OBJ/Vo2" />
    <par>
        <vo src= "file:///dvddisc/ADV_OBJ/Vo3" />
        <vo src= "file:///dvddisc/ADV_OBJ/Vo4" />
    </par>
</seq>
</playlist>
```

FIG. 16

```
<r:grant>
    <!__=LICENSEE=__>
    <r:keyHolder/>
```
— 5001

```
    <!__=PERMITTED OPERATION=__>
    <belinked/>
```
— 5002

```
    <!__=TARGET CONTENT=__>
    <r:digitalResource>
        <r:nonSecureIndirect URI= "file:///dvddisc/ADV_OBJ/Vo3" />
    </r:digitalResource>
```
— 5003

```
    <!__=USAGE CONDITION=__>
    </r:allConditions>
```
— 5004

```
        <r:validityInterval>
            <r:notBeforer> 2006-01-01T00:00:00</r:notBeforer>
            <r:notAfter>2010-12-31T12:59:59</r:notAfter>
        </r:validityInterval>
```
— 5005

```
        <derivationConstraint>
            <resourceLocator name= "file:///dvddisc/ADV_OBJ/Vo3" />
        </derivationConstraint>
```
— 5006

```
    </r:allConditions>
</r:grant>
```

FIG. 17A

```
<r:grant>
    <!__=LICENSEE=__>
    <r:keyHolder/>
    <!__=PERMITTED OPERATION=__>
    <belinked/>
    <!__=TARGET CONTENT=__>
    <r:digitalResource>
        <r:nonSecureIndirect URI= "file:///dvddisc/ADV_OBJ/Vo2" />
    </r:digitalResource>
    <!__=USAGE CONDITION=__>
    <r:allConditions>
        <r:validityInterval>
            <r:notBeforer> 2006-01-01T00:00:00</r:notBeforer>
            <r:notAfter>2010-12-31T12:59:59</r:notAfter>
        </r:validityInterval>
        <derivationConstraint>
            <resourceLocator name= "file:///dvddisc/ADV_OBJ/Vo2" />
            <resourceIncusionList temporalRelation= "before" inclusionType= "link" >
                <r:digitalResource>
                    <r:nonSecureIndirect URI= "file:///dvddisc/ADV_OBJ/Vo4" />
                </r:digitalResource>
                <resourceLocator name= "file:///dvddisc/ADV_OBJ/Vo4" />
            </bpx:resourceIncusionList>
        </derivationConstraint>
    </r:allConditions>
</r:grant>
```

```
<r:grant>
    <!--=LICENSEE=__-->
    <r:keyHolder/>
    <!--=PERMITTED OPERATION=__-->
    <mx:play/>
    <!--=TARGET CONTENT=__-->
    <r:digitalResource>
        <r:nonSecureIndirect URI="file:///dvddisc/ADV_OBJ/Vo2" />
    </r:digitalResource>
    <!--=USAGE CONDITION=__-->
</r:grant>
```

FIG. 18

Step1: START EDITING WITH EMPTY PLAYLIST AND
DEFAULT TUF RECEIVED FROM REMOTE SERVER 1003

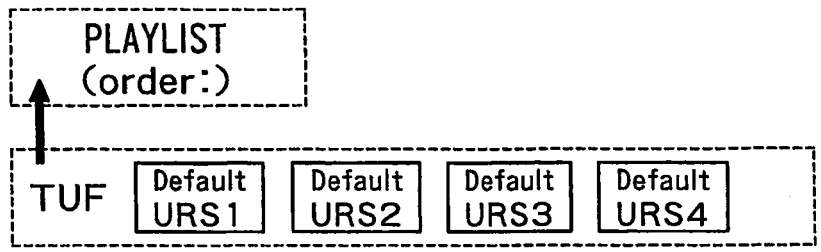

Step2: CONTENT PARTS Vo2, Vo3 THAT CAN BE
ADDED TO PLAYLIST ARE PRESENTED

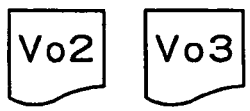

Step3: SELECT Vo2 AS CONTENT PART THAT USER WANTS TO
ADD TO PLAYLIST

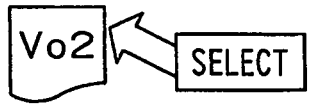

Step4: SEARCH FOR Vo4 AND EVALUATE LICENSE CONDITION FOR Vo4 TO SATISFY
CONDITION FOR PERMISSION TO LINK TO Vo2. AS A RESULT OF EVALUATION,
CREATE PLAYLIST ADJUSTED TO REPRODUCE IN ORDER OF Vo4, Vo2
AND MAKE LINK TO EACH CONTENT PART

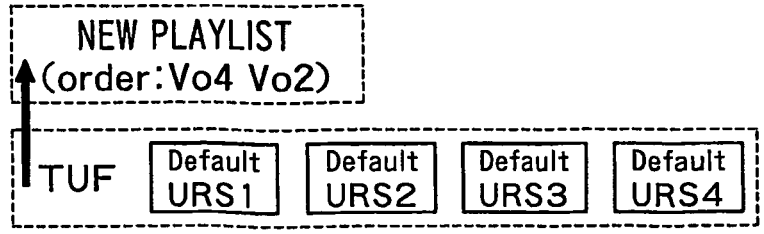

Step5: SAVE NEW PLAYLIST AND DEFAULT TUF IN PLAYLIST STORAGE

FIG. 20

```
<r:grant>
    <l__=LICENSEE=__>
    <r:keyHolder/>
    <l__=PERMITTED OPERATION=__>
    <beLinked/>
    <l__=TARGET CONTENT=__>
    <r:digitalResource>
        <r:nonSecureIndirect URI="file:///dvddisc/ADV_OBJ/Vo2" />
    </r:digitalResource>
    <l__=USAGE CONDITION=__>
    <r:allConditions>
        <r:validityInterval>
            <r:notBefore> 2006-01-01T00:00:00</r:notBefore>
            <r:notAfter>2010-12-31T12:59:59:</r:notAfter>
        </r:validityInterval>
        <derivationConstraint>
            <resourceLocator name="file:///dvddisc/ADV_OBJ/Vo2" />
            ┌─────────────────────────────────────────────────────────────────────────┐
            │ <resourceInclusionList temporalRelation="before" inclusionType="store_and_link" > │
            │     <r:digitalResource>                                                 │
            │         <r:nonSecureIndirect URI="http://www.vod.com/0001/001/ADV_OBJ/Vo5" /> │ 10001
            │     </r:digitalResource>                                                │
            │     <resourceLocator name="file:///p_storage/ADV_OBJ/Vo5" />            │
            │ </bpx:resourceInclusionList>                                            │
            └─────────────────────────────────────────────────────────────────────────┘
        </derivationConstraint>
    </r:allConditions>
</r:grant>
```

FIG. 22

Step1: START EDITING WITH EMPTY PLAYLIST AND
DEFAULT TUF RECEIVED FROM REMOTE SERVER 1003

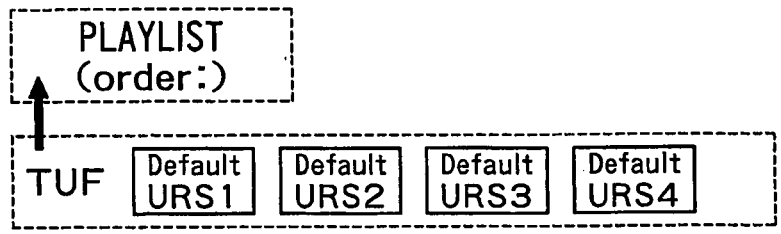

Step2: CONTENT PARTS Vo2, Vo3 THAT CAN BE
ADDED TO PLAYLIST ARE PRESENTED

Step3: SELECT Vo2 AS CONTENT PART THAT USER WANTS TO
ADD TO PLAYLIST

Step4: DOWNLOAD Vo5 TO SATISFY
CONDITION FOR PERMISSION TO ENLIST TO Vo2.
CREATE PLAYLIST ADJUSTED TO PLAY BACK IN ORDER OF Vo5, Vo2 AND
MAKE LINK TO EACH CONTENT PART

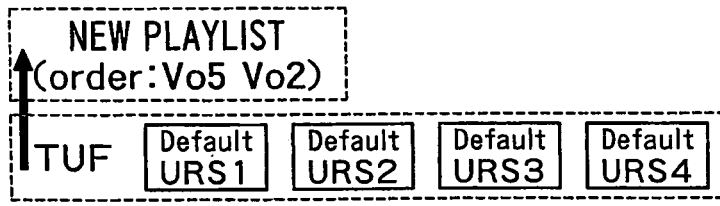

Step5: DOWNLOAD URS5 TO PLAYLIST STORAGE AND ADD TO DEFAULT TUF

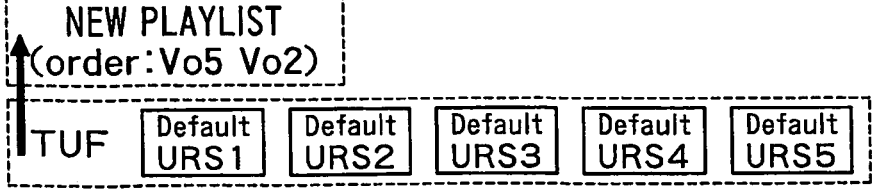

Step6: SAVE NEW PLAYLIST AND DEFAULT TUF AND Vo5 IN PLAYLIST STORAGE

FIG. 24

```
<r:grant>
<l__=LICENSEE=__>
<r:keyHolder/>
<l__=PERMITTED OPERATION=__>
<beCut/>
<l__=TARGET CONTENT=__>
<r:digitalResource>
    <r:nonSecureIndirect URI="file:///dvddisc/ADV_OBJ/Vo2"/>
</r:digitalResource>
<l__=USAGE CONDITION=__>
<r:allConditions>
    <derivationConstraint>
        <isPartOf>                                                          ⎫
            <r:digitalResource>                                             ⎪
                <r:nonSecureIndirect URI="urn:pl001"/>                      ⎬ 2701
            </r:digitalResource>                                            ⎪
        </isPartOf>                                                         ⎭
        <replacementResourceList>                                           ⎫
            <r:digitalResource>                                             ⎪
                <r:nonSecureIndirect URI="file:///dvddisc/ADV_OBJ/Vo4"/>    ⎪
            </r:digitalResource>                                            ⎬ 2702
            <r:digitalResource>                                             ⎪
                <r:nonSecureIndirect URI="file:///dvddisc/ADV_OBJ/Vo5"/>    ⎪
            </r:digitalResource>                                            ⎪
        </replacementResourceList>                                          ⎭
    </derivationConstraint>
</r:allConditions>
</r:grant>
```

FIG. 27

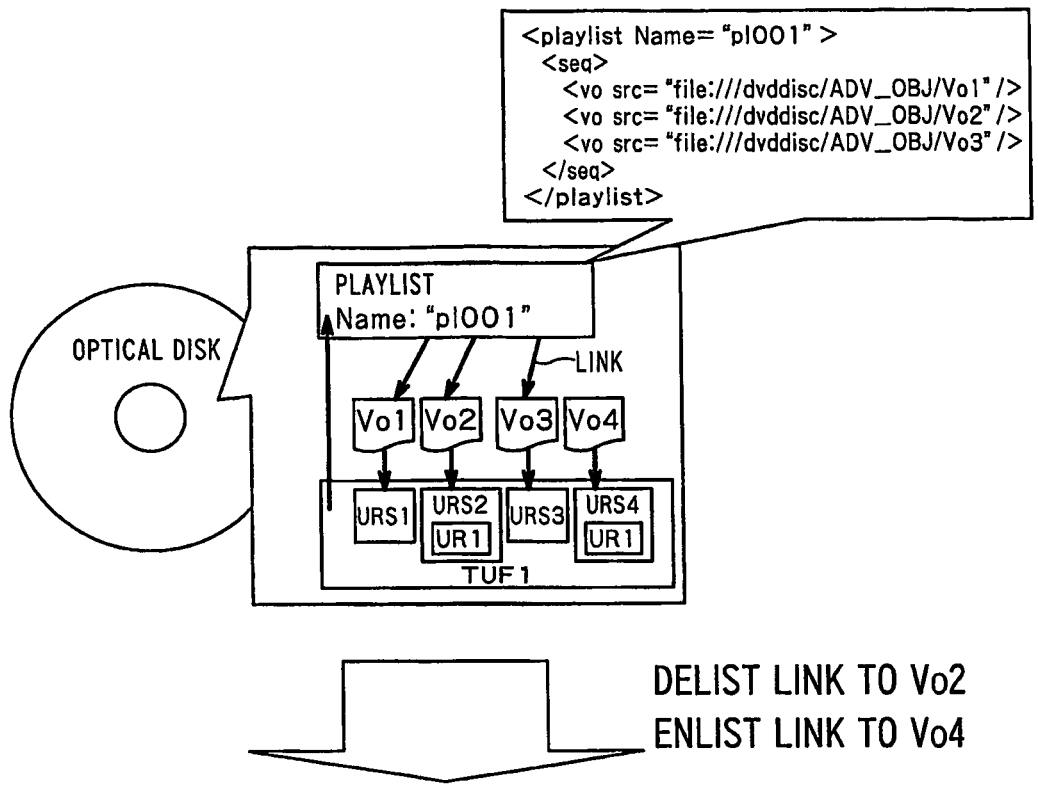
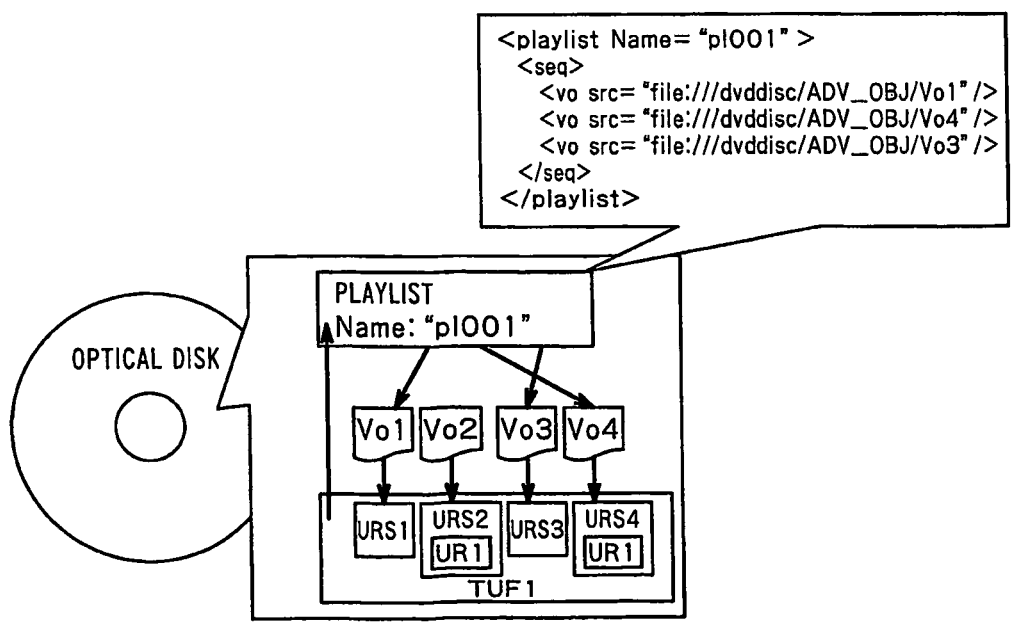
FIG. 28

APPARATUS AND METHOD FOR PLAYBACK OF DIGITAL CONTENT

This application is the US national phase of international application PCT/JP2007/050363 filed 5 Jan. 2007 which designated the U.S. and claims benefit of JP 2006-000558 filed 5 Jan. 2006, and JP 2006-072678 filed 16 Mar. 2006, the entire contents of each of which are hereby incorporated by reference.

BACKGROUND OF THE INVENTION

1. Field of the Invention

The present invention relates to a digital content playback apparatus and a method for editing a digital content, which create new digital content based on license information which defines conditions for permitting edit of a commercial multimedia content.

2. Related Art

In recent years, many DRMs (Digital Right Management) as the technologies that protect copyrights of digital works have been developed. In particular for commercial digital content such as movies or music, due to strong demand for preventing copying of digital content, copyright protection features provide very robust mechanisms and there is no room for users to create and enjoy secondary content for their private use.

In such a situation, international standardization activities are under way, such as ISO/IEC 21000 (MPEG-21) aimed at the distribution and management of various forms of digital content. In MPEG-21, a language (DIDL: Digital Item Declaration Language) for expressing compound content constructed by combination/coupling of a plurality of content parts and a Rights Expression Language (REL) enabling flexible license description are being standardized and a framework for protecting the rights of compound content consisting of a plurality of content parts is being in place. Among reference documents is "Information Technology-Multimedia Framework (MPEG-21)-Part 5: Rights Expression Language, 2004".

Also in the case of commercial content in an unrewritable medium, provided for next generation DVD players, it is technically possible not only to faithfully play back a preprepared content but also to divide the content into components and recombine them to use at the time of playback.

FIG. 12 illustrates an example of an enabling method of the next generation DVDs being studied by AACS (Advanced Access Content System). In medium 101 containing commercial content, the entity of multimedia content consists of content parts referred to as video objects. The video objects are played back or copied as completely integrated content, according to a script called a playlist that controls the timing of executing playback. The playlist is described as a script and is able to control details such as a start time of playback each video object, an order of playback, synchronized playback, display positions on the screen, and so on.

The license conditions (usage rules) of each video object are described in a TUF (Title Usage File). Each video object is encrypted and license conditions of each video object are checked when executing operations such as playback and if the license conditions are satisfied, then it is decrypted using a decryption key and played back according to a playlist.

A player 102 of the medium 101 connects to a server 103 that manages content via networks, and obtains a license of DI_2 recorded in the medium 101, downloads DI_3 to a temporary storage 104 to use it as an work integrated with other video objects originally recorded in the medium, or uses DI_5 provided as steaming integrated with other video objects, and thus more flexible use forms are possible than before. It is also possible to treat sub-content such as subtitles or voice as a kind of video objects. The playlist to use by default is pre-recorded on the medium but it is also possible to request the server 103 to create a new playlist or to permit modification and play back the newly created playlist on the player 102.

The details of the above-mentioned technologies are described in "AACS Introduction and Common Cryptographic Elements Preliminary Draft Revision 0.90, 14 Apr. 2005".

Permitting a user to generate a new playlist facilitates creating secondary content by combining video objects as content parts or changing the order of playback video object but on the other hand, the copyrights are violated and it will possibly turn into secondary content in which the original intentions of content authors are neglected. This is a major problem in commercial content.

To solve it, for commercial content, an attempt has been started to describe information for limiting modification of a playlist as part of license conditions in a TUF. Using description that extends the above-described Rights Expression Language (REL) allows generic description of rights conditions including basic rights expression. It is proposed in JP-A 2006-099645 (KOKAI) to allow to describe as part of license conditions, a complementary relationship condition specifying an other video object that must be contained together when using the video object in a newly created content.

For commercial content, however, it is expected that users more typically make local modifications by replacing some scenes, music or subtitles to enjoy variations of content than substantial modification the content by using full-fledged video editing tools like nerds. Content holders also desire a mechanism that can not substantially impair the integrity of a work. Playlists also strictly manage the timing of playback each video object, and therefore permitting unknowledgeable users to conveniently replace or rearrange video objects having different playback durations or characteristics may result in content that can not be played back.

SUMMARY OF THE INVENTION

According to an aspect of the present invention, there is provided with a digital content playback apparatus which generates new digital content by replacing one or more content parts included in digital content by one or more other content parts, comprising:

a content storage configured to store a plurality of content parts, a license information storage configured to store license information describing license conditions defined for the content parts, each of which includes at least a replacement permission condition and a replacement target specification condition among the replacement permission condition defining whether the content part is replaceable by an other content part, the replacement target specification condition specifying content parts being candidates of replacement target when the replacement permission condition is replaceable and a complementary relationship condition specifying another content part that must be contained in digital content when using the content part, a content part selecting unit configured to allow a user to specify a replacement source content part as a content part that should be replaced among content parts in the digital content including some content parts in the content storage, and a replacement target content part as a content part for adding to the digital content for replacing the replacement source content part, a verifying unit configured to verify whether license conditions of content parts in the digital content and the replacement target content part would be satisfied when replacing the replacement source content part by the replacement target content part, a content generation unit configured to generate new digital content by replacing the replacement source content part by the replacement target content part when determined as being satisfied by the verifying unit; and a content playback unit configured to play back the generated new digital content.

According to an aspect of the present invention, there is provided with a digital content playback method which generates new digital content by replacing one or more content parts included in digital content by one or more other content parts, comprising:

providing a content storage configured to store a plurality of content parts, and a license information storage configured to store license information describing license conditions defined for the content parts, each of which includes at least a replacement permission condition and a replacement target specification condition among the replacement permission condition defining whether the content part is replaceable by an other content part, the replacement target specification condition specifying content parts being candidates of replacement target when the replacement permission condition is replaceable and a complementary relationship condition specifying another content part that must be contained in digital content when using the content part, specifying by user a replacement source content part as a content part that should be replaced among content parts in the digital content including some content parts in the content storage, and a replacement target content part as a content part for adding to the digital content for replacing the replacement source content part, verifying whether license conditions of content parts in the digital content and the replacement target content part would be satisfied when replacing the replacement source content part by the replacement target content part, generating new digital content by replacing the replacement source content part by the replacement target content part when determined as being satisfied as a result of the verifying; and playback the generated new digital content.

According to an aspect of the present invention, there is provided with a digital content playback apparatus which plays back a first digital content by playback content parts recorded in an optical disk based on a playback control sequence for controlling playback of the content parts and a first license file including a plurality of license information pieces describing license conditions defined for content parts, comprising:

a reading unit configured to read the playback control sequence, the first license file, identification information of the first digital content, information on a place to obtain a playback control sequence to be edited, and the content parts from the optical disk;

an editing unit configured to access the place shown in the information, obtain the playback control sequence to be edited and a second license file including one or more the license information pieces describing the license conditions for one or more content parts among the content parts, based on identification information of the playback control sequence and the identification information of the first digital content, select content parts which have license information pieces describing a permission of a link and a condition to permit the link among the content parts, and add links to the selected content parts to the playback control sequence to be edited such that the conditions to permit the links described in the license information pieces of the selected content parts are satisfied;

a storage configured to store the playback control sequence edited by the editing unit and the second license file; and a playback unit configured to play back a second digital content by playback content parts based on the playback control sequence edited by the editing unit and the second license file.

BRIEF DESCRIPTION OF THE DRAWINGS

FIG. 16 illustrates an example of the data structure of the playlist;

FIGS. 17A and 17B illustrate examples of description of usage rule;

FIG. 18 illustrates an example of description of the usage rule in the default TUF;

FIG. 20 illustrates an execution scenario for the usage rule in FIG. 19;

FIG. 22 illustrates an example of description of a usage rule;

FIG. 24 illustrates an execution scenario for the usage rule in FIG. 22;

FIG. 27 illustrates an example of description of a usage rule; and

FIG. 28 illustrates an example of the execution of editing in a fourth embodiment.

DETAILED DESCRIPTION OF THE INVENTION

[First Embodiment]

Figure 1:
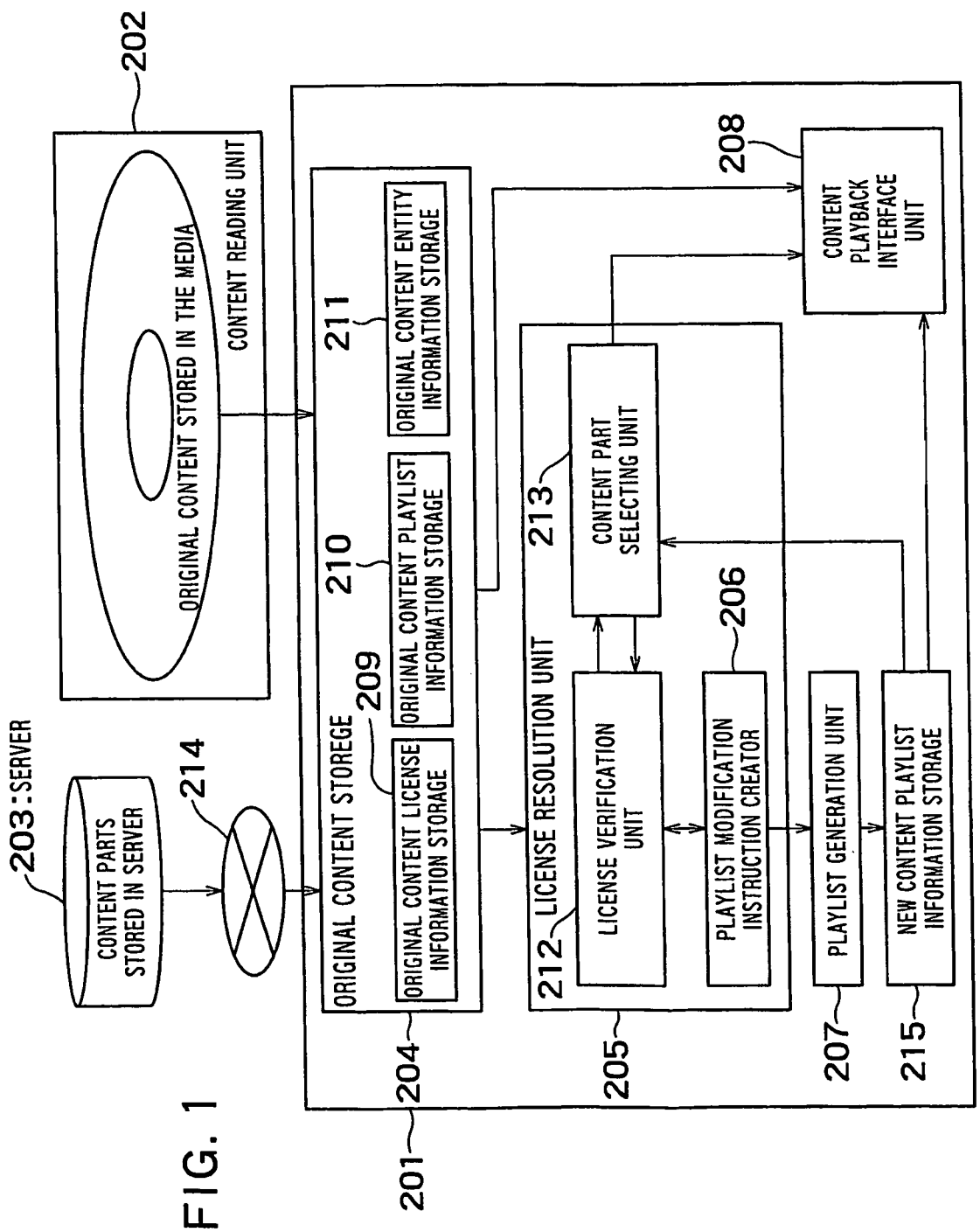
FIG. 1 is a functional block diagram illustrating the configuration of digital content editing/playback apparatus according to a first embodiment of the invention.

FIG. 1 is a functional block diagram illustrating the configuration of digital content editing/playback apparatus according to a first embodiment of the invention. Functions achieved by the digital content editing/playback apparatus may be achieved by causing a computer to execute programs or by units of hardware.

Based on user's operations, the digital content editing/playback apparatus 201 reads original digital content recorded in a medium through a content reading unit 202 or downloads content parts from an external server 203 via a network 214. The digital content editing/playback apparatus 201 stores the content read from the medium and the content parts downloaded from the server 203 in an original content storage (database) 204.

More particularly, the content read from the medium includes a plurality of video objects, a TUF (Title Usage File) consisting of license information of each video object and playlist information. The license information of these respective video objects is stored in an original content license information storage (license information storage) 209, playlist information is stored in an original content playlist information storage 210, and data of each video object is stored in an original content entity information storage 211. On the other hand, the content parts downloaded from the server 203 includes video objects representing entities of the content part and license information of the video objects. The license information is stored in the original content license information storage 209, and data of video objects is stored in the original content entity information storage 211.

A content part selecting unit 213 in a license resolution unit 205 generates information on video objects which can be replaced by other video objects among video objects included in content to be edited and information on video objects which are candidates newly added for replacing these video objects based on a playlist of the content to be edited and license information of each video object in the original content license information storage 209. A content part selecting unit 213 displays the generated information on a content playback/interface unit 208.

The user specifies video objects that the user wants to replace by other video objects and other objects that the user want to newly add instead of these video objects via the content playback/interface unit 208 based on the information displayed on the content playback/interface unit 208.

A license verification unit 212 in the license resolution unit 205 verifies whether the license conditions described in the license information of each video object contained in the digital content after the replacement would be satisfied if the replacement was made. Moreover, it also verifies whether the license conditions of the video objects specified by the user to be replaced by other objects would be satisfied if necessary. A license condition of one video object includes a plurality of conditions as described below (see FIG. 3).

A playlist modification instruction creator 206 creates playlist modification instruction information that instructs to modify the playlist to be edited when the license verification unit 212 determines the license conditions of each video object would be satisfied.

A playlist generation unit 207 generates a new playlist based on the playlist modification instruction information and stores the newly generated playlist in a new content playlist information storage 215.

The content playback/interface unit 208 sequentially plays back the video objects stored in the original content entity information storage 211 according to the new content playlist.

Figure 2:
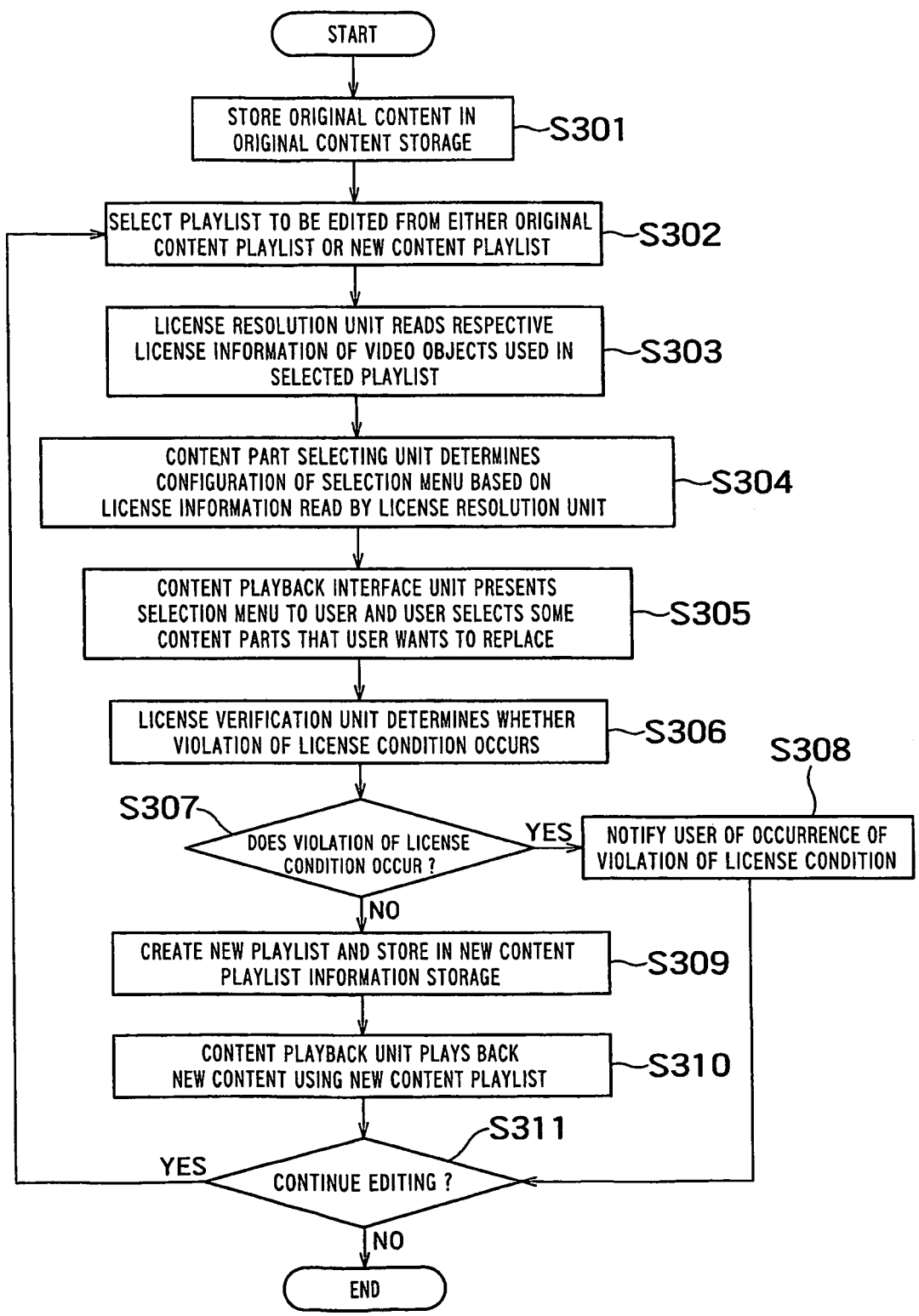
FIG. 2 is a flowchart illustrating the flow of the entire processing of the digital content editing/playback apparatus in FIG. 1.

FIG. 2 is a flowchart illustrating the flow of the entire processing of the digital content editing/playback apparatus 201 in FIG. 1.

Initially, the original content storage 204 reads content data and stores each video object contained in the read content (original content) in the original content entity information storage 211, license information of each video object in the original content license information storage 209 and playlist information in the playlist storage 210 (S301). In addition to content locally existing in the medium, content may exist in an external server and downloaded via a network. Also, as described above, content parts are downloaded from the server 203 and video objects may be stored in the original content entity information storage 211 and license information may be stored in the original content license information storage 209.

Then, the user selects a playlist to be edited from the playlists stored in the original content playlist information storage 210 or the new playlists stored in the new content playlist information storage 215 (S302). The license resolution unit 205 reads license information of each video object to be used in the selected playlist from the original content license information storage 209 (S303).

Next, the content part selecting unit 213 in the license resolution unit 205 determines the configuration of a replacement content candidate selection menu to be displayed for user, based on replacement permission conditions, replacement target specification conditions and automatic selection specification conditions in the read license information of each video object (S304). The content part selecting unit 213 presents the determined replacement content candidate selection menu to user via the content playback/interface unit 208 (S305). The user selects some video objects that the user wants to replace by other video objects in the digital content to be edited and specifies video objects that the user wants to add for replacing these video objects (S305). The details of these processes (S304, S305) will be described below.

Then, the license verification unit 212 determines whether violation of the license conditions would occur if the replacement of the video objects was made as specified by the user (S306). That is, it verifies whether the replacement would infringe on the license conditions of each video content contained in the digital content after the replacement if the replacement was made. However, when instead of presenting to the user a replacement content candidate selection menu like S304 and S305, simply letting the user arbitrarily specify video objects in the digital content that the user wants to replace by other video objects and new objects that the user wants to add, it also verifies whether the license conditions (especially the replacement permission condition, replacement target specification condition and automatic selection specification condition) of the video objects that the user wants to replace by other video objects would be satisfied. The details of the process of S306 will be described below.

When violation of the license conditions occurs (YES in S307), the license resolution unit 205 informs the user of the occurrence of the violation of the license conditions via the content playback/interface unit 208 (S308). When no violation of the license conditions occurs (NO in S307), the playlist modification instruction creator 206 creates playlist modification instruction information and the playlist generation unit 207 creates a new playlist based on this playlist modification instruction information (S309). The playlist generation unit 207 stores the newly created playlist in the new content playlist information storage 215 (S309).

The content playback/interface unit 208 uses the playlist for new content to play back new content according user's instruction (S310). When the user wants to further edit a portion of the new content (YES in S311), it returns to the process of S302.

Figures 3, 4:
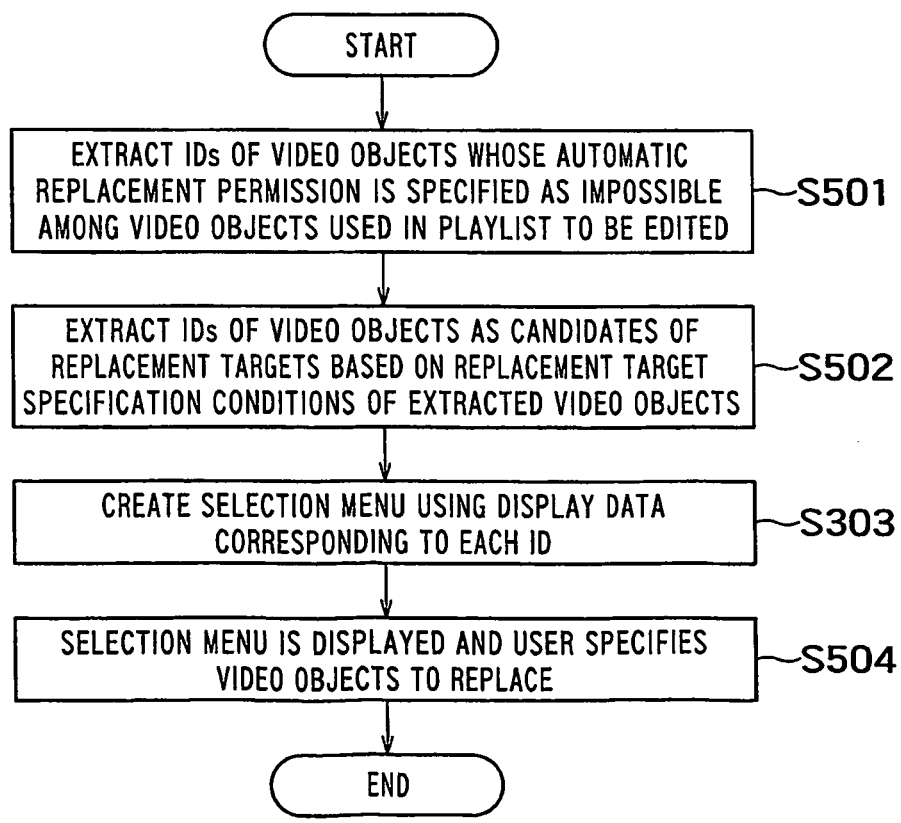
FIG. 3 illustrates an example of license information.
FIG. 4 is a flowchart describing the details of the processes of the content part selecting unit.

FIG. 3 illustrates an example of a license condition described in license information (usage rule) of video object 102.

The license condition includes a video object ID, a replacement permission condition, a replacement target specification condition, a complement specification condition, a complementary relationship condition and an automatic selection specification condition.

The video object ID is an identifier that uniquely identifies a video object. Instead of describing IDs, URIs may be described.

The replacement permission condition is a flag of 0 (impossible) or 1 (possible) identifying whether replacing the video object shown in the video object ID by other object is possible.

The replacement target specification condition lists IDs of video objects that may be candidates for replacement targets. When the replacement permission condition is 0 (impossible), the replacement target specification condition is omitted. In case of this example, the candidates for replacement targets of a video object 102 are video object 1002 or 1032.

The complement specification condition is a flag of 0 (absent) or 1 (present) identifying whether a complementary relationship condition is defined.

The complementary relationship condition lists IDs of video objects that must be necessarily used when using the video object shown in the video object ID in the digital content. When the complement specification condition is 0 (absent), the complementary relationship condition is omitted. In case of this example, when a video object 102 is used, both of video object 2002 and 5002 must be used in the same content.

The automatic selection specification condition is a flag of 0 or 1 identifying whether to allow a video object as a replacement target to be automatically selected (value is 1) or allow the user themselves to specify the video object (value is 0), when replacing the video object shown in the video object ID by the video object. That is, the automatic selection specification condition specifies whether to allow the replacement of the video object shown in the video object ID by another object without user instruction. The automatic selection specification condition is omitted when the replacement permission condition is 0 (impossible).

In the license information of FIG. 3, conditions other than the above, such as a validity period during which a video object is available, a flag to indicate whether temporary storage in a terminal is possible or whether copying is possible may be also described.

FIG. 4 is a flowchart illustrating the details of the processes (S304, S305) of the content part selecting unit 213.

The content part selecting unit 213 first refers to the automatic selection specification conditions in the license information of each video object used in the playlist to be edited and extracts IDs of video objects whose automatic selection specification is impossible, i.e. those which are permitted to be directly specified by the user (S501).

Then, referring to the replacement target specification conditions of the extracted video objects, IDs of video objects being candidates for replacement targets are extracted for each of the extracted video objects (S502).

Then, a replacement content candidate selection menu is created using display data to display each video object permitted to be directly specified by the user and display data to display the video objects which are candidates for replacement targets corresponding to these video objects to the menu (S503).

Finally, via the content playback/interface unit 208, the replacement content candidate selection menu is displayed and the user is allowed to specify video objects that the user wants to replace by other video objects in the digital content to be edited and video objects that the user wants to newly add for replacing the video objects (S504).

Figure 5:
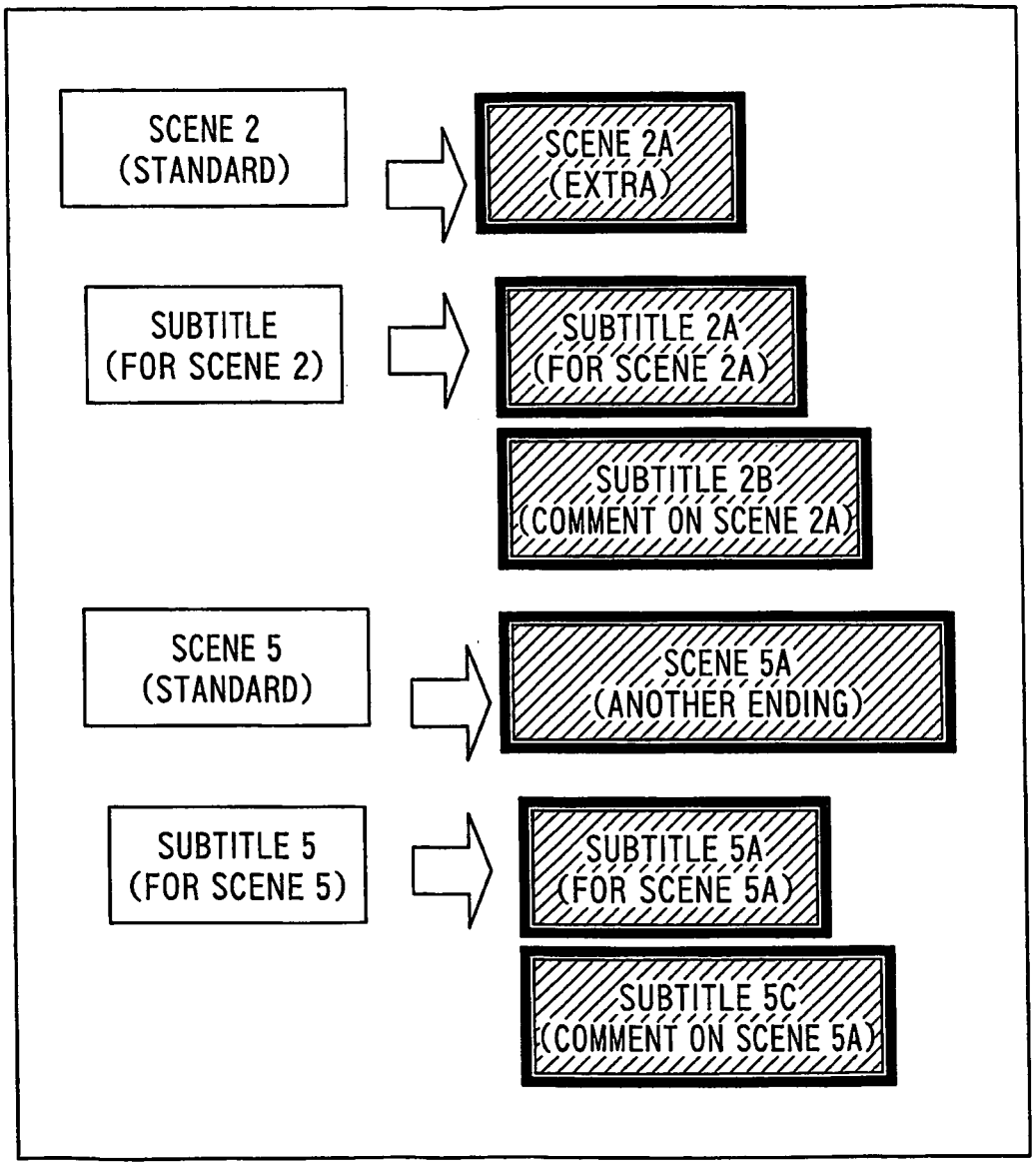
FIG. 5 illustrates an example of a replacement content candidate selection menu.

FIG. 5 illustrates an example of a replacement content candidate selection menu.

In FIG. 5, displayed in the left-hand is the display buttons corresponding to video objects being used in the digital content to be edited (in more detail, video objects whose automatic selection specification condition is impossible), and in the right-hand is the display buttons corresponding to video objects that are candidate for replacing the video objects in the left-hand. For example, as subtitle 2, any of the original subtitle 2, subtitle 2A or subtitle 2B (comment) can be chosen. When any right button is not pressed, the original video object corresponding to the left button is selected by default. In the following, the video object selected by the user in the right-hand may be also referred to as "video object specified as replacement".

Assume that texts and images on buttons are read at the same time as the original content storage 204 reads content data or content parts via the content reading unit 202 or the server 203 and internally stored as display data associated with IDs of each video object whose automatic selection specification condition is impossible. When display data is not prepared, video object IDs themselves may be displayed. Also, display forms for allowing the user to make a selection may include a variety of forms such as check buttons, pull-down menus besides push-buttons.

Next, the processes of the license verification unit 212 and the playlist modification instruction creator 206 (S306 to S309 in FIG. 2) will be described in detail using FIG. 6 to FIG. 11.

Figure 6:
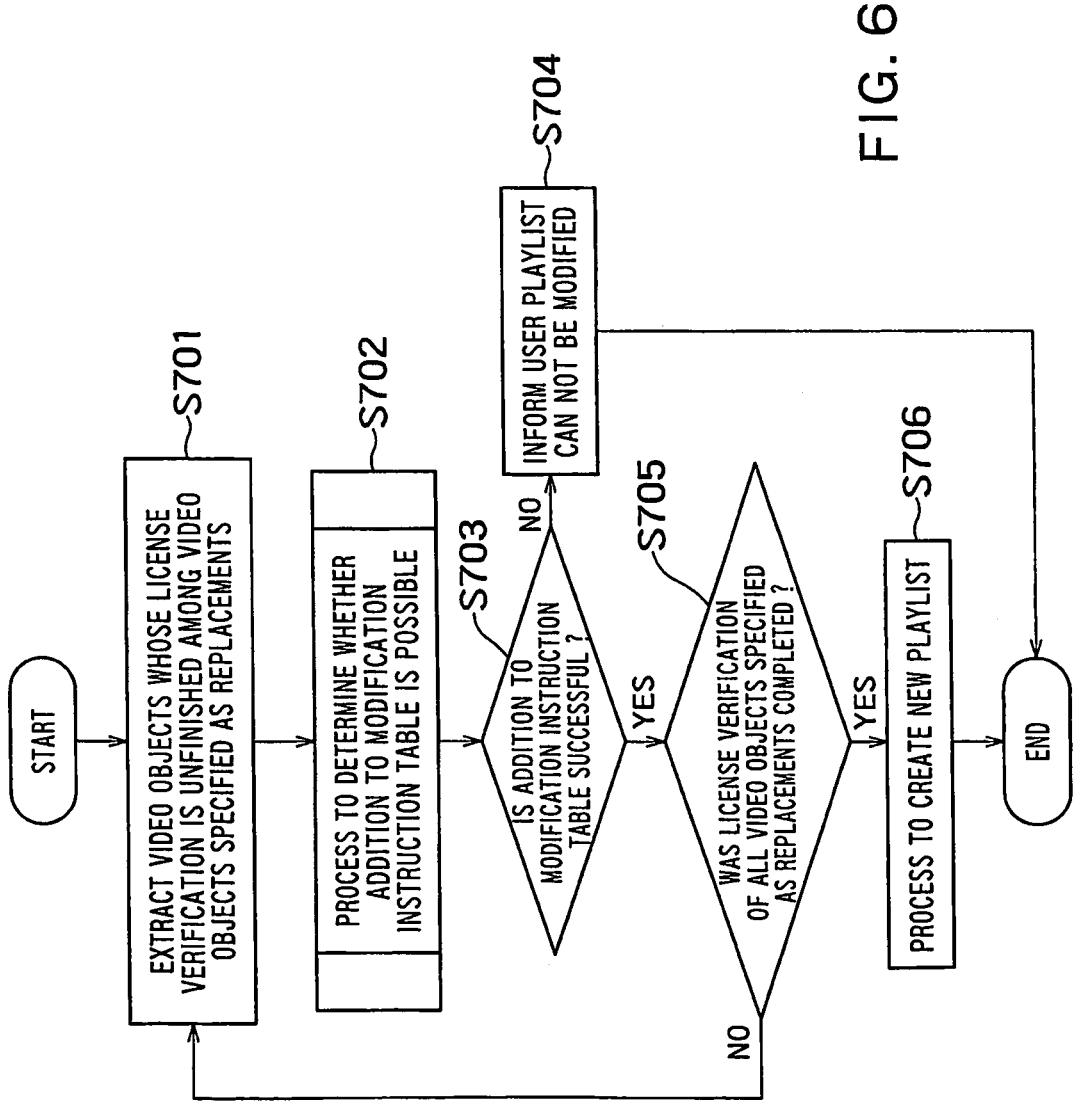
FIG. 6 is a flowchart describing the processes of the license verification unit and playlist modification instruction creator.

FIG. 6 is a flowchart illustrating the details of the processes of the license verification unit 212 and the playlist modification instruction creator 206.

First, the license verification unit 212 extracts video objects whose license verification is unfinished among those which are specified as replacements by the user via the content playback/interface unit 208 (S701). Then, the playlist modification instruction creator 206 performs a "process to determine whether addition to a modification instruction table (FIG. 11) can be made" described below (S702).

When it fails in the "process to determine whether addition to the modification instruction table can be made" (NO in S703), the user is informed that the playlist modification can not be made (S704) and if it succeeds (YES in S703), it is determined whether the license verification of all the video objects specified as replacements have been completed (S705). If not completed (NO in S705), it returns to S701, and if completed (YES in S705), the playlist generation unit 207 generates a new playlist based on information in the modification instruction table and information on the playlist to be edited (original playlist) (S706).

Figure 7:
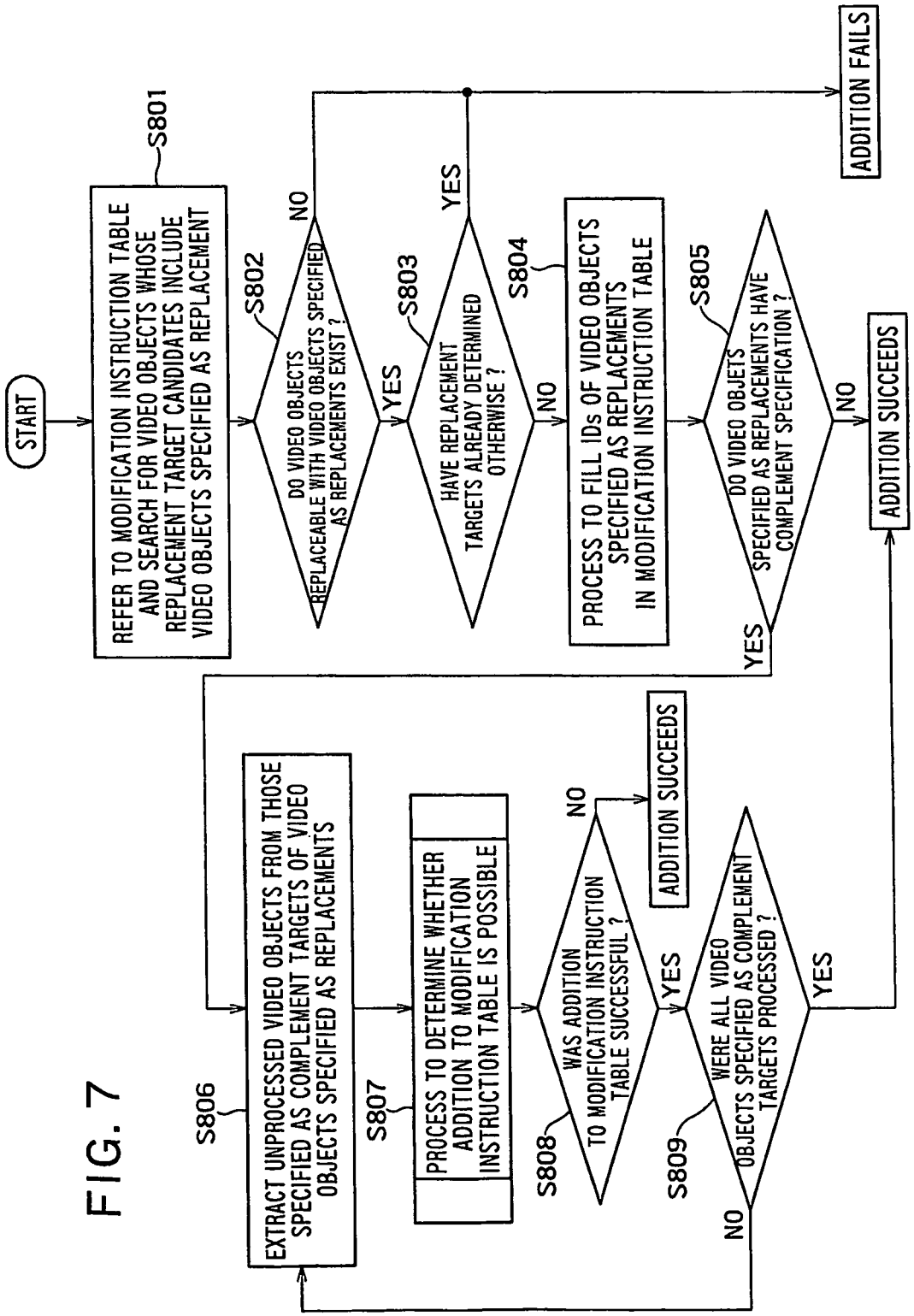
FIG. 7 is a flowchart describing the details of the process of S702 in FIG. 6.

FIG. 7 is a flowchart illustrating the process of S702 in detail.

Figure 11:
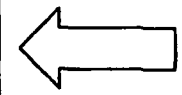
FIG. 11 illustrates an example of a modification instruction table.
Figure 12:
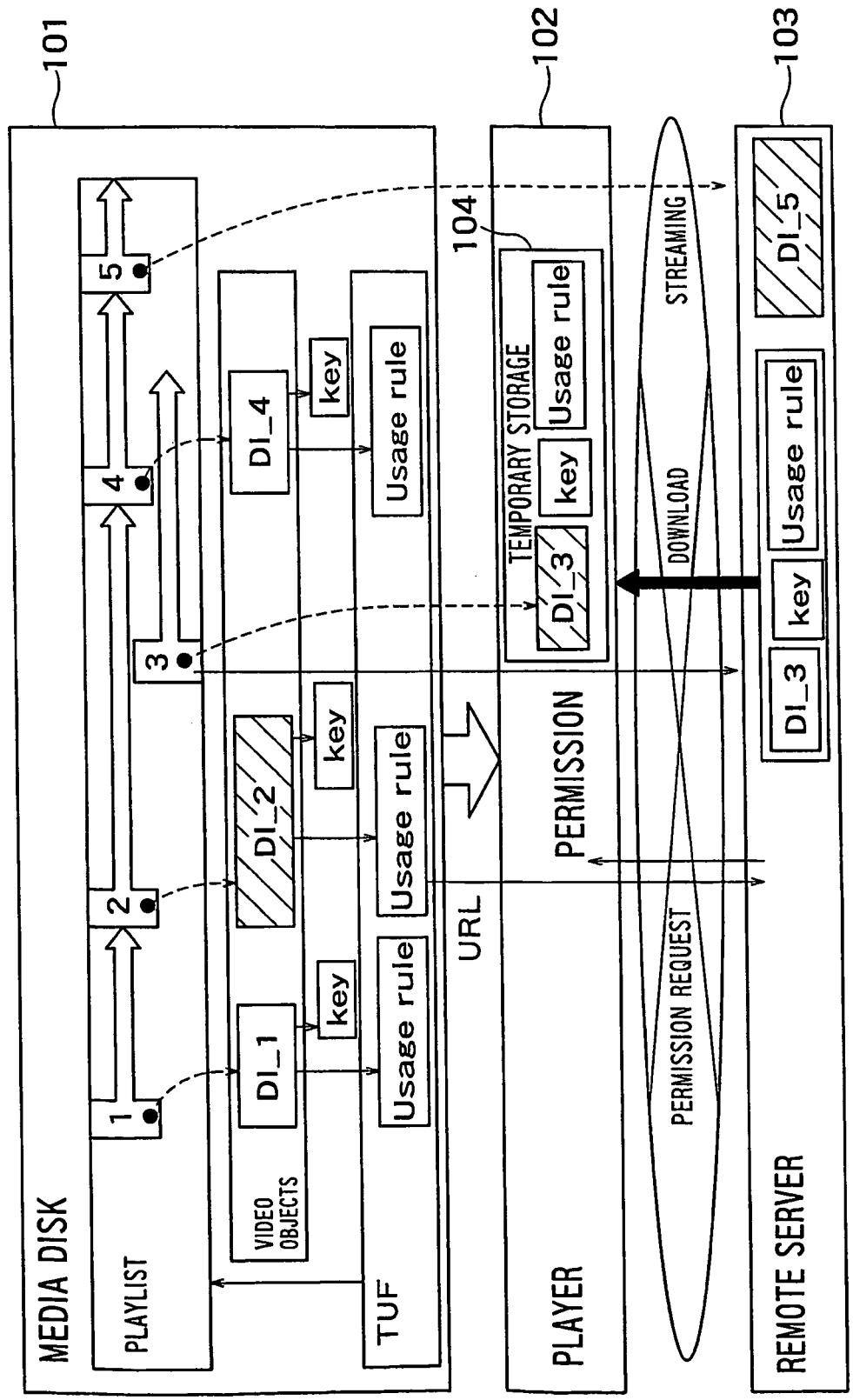
FIG. 12 illustrates an example of an enabling method of the next generation DVDs being studied by AACS (Advanced Access Content System Licensing Administrator)

First, the playlist modification instruction creator 206 refers to a modification instruction table. An example of a modification instruction table is illustrated in FIG. 11. A modification instruction table is a table to hold IDs of all video objects whose replacement permission condition is replaceable (IDs of replacement source video objects), IDs of video objects described in the replacement target specification conditions of the replacement source video objects (IDs of replacement target video object candidates) and IDs of replacement target video objects. It is assumed that the fields of the replacement target video object IDs are initially empty. In the modification instruction table of the final state (the modification instruction table after YES in S705 of FIG. 6), the replacement target video objects stored in the fields of the replacement target video object IDs will be video objects newly added to the digital content for replacing the replacement source video objects. When the replacement source video objects still continue to be used in new digital content, the IDs of the replacement source video objects are stored in the fields of the replacement target video object IDs. It is assumed that the modification instruction table in the initial state is created by the content part selecting unit 213, for example.

The modification instruction creator 206 referring to the modification instruction table searches the modification instruction table for replacement source video objects whose replacement target video object candidates include the video object specified as replacement (S801). If such replacement source video objects do not exist (NO in S802), the process is terminated as a process failure. Also when the replacement source video objects found in S801 are already determined to be replaced by other replacement target video objects (YES in S803), the process is terminated as a process failure. When the process is terminated as a process failure, it proceeds to S704 in FIG. 6. If no problem is found (NO in S803), the IDs of the video objects specified as replacements by the user are filled in the replacement target video object ID fields (S804).

Then, based on the complement specification condition in the license conditions of the replacement target video objects filled in S804, whether a complement specification exists is identified (S805), and if there is a complement specification (YES in S805), video objects specified as complement targets in the complementary relationship condition are extracted (S806), and a "process to determine whether addition to the modification instruction table can be made" is recursively called to newly add the video objects (S807). The process of S807 is basically the same as the process of S702. When it fails in the "process to determine whether addition to the modification instruction table can be made" (NO in S808), the process is terminated as a process failure. If it succeeds (YES in S808), whether all of the video objects specified as complement targets were processed is determined (S809), if completed (YES in S809), then "the process to determine whether addition to the modification instruction table can be made" is determined as successful and the process is returned to the invoker (i.e.S702), and if not completed (NO in S809), then it goes back to S806.

Figure 8:
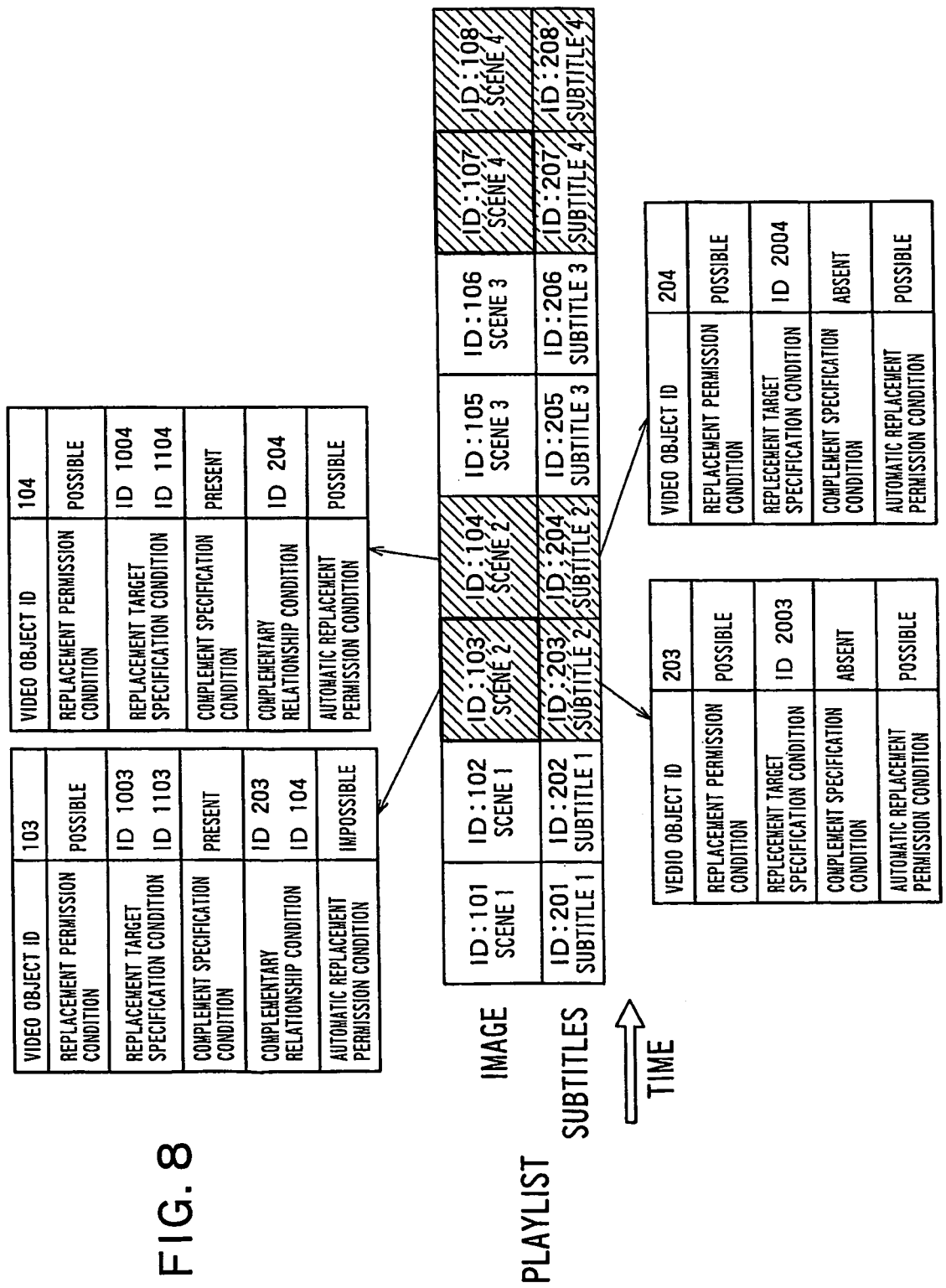
FIG. 8 illustrates a simple playlist image and an example of the license conditions of the video objects contained in the playlist.

FIG. 8 illustrates a simple playlist image and an example of the license conditions of the video objects contained in the playlist.

A playlist is a script to control the timing of executing video object playback but here, it is simplified and illustrated as arranging video objects along time axis according to a playback order. In this example, images and subtitles are different video objects and four video objects together make up one scene. For instance, 4 video objects 101, 102, 201, 202 together make up one scene.

In this example, hatched video objects (8 in total) are described as possible (replaceable) in the replacement permission condition. Also, among these hatched video objects, only video objects 103 and 107 indicated by heavy line-frames are described as impossible in the automatic selection specification condition. That is, the video objects 103 and 107 are portions that the user themselves selects from heretofore mentioned replacement content candidate selection menu and are prohibited from being replaced by other video objects without user instruction. Other video objects 104, 108, 203, 204, 207, 208 are automatically replaced according to a complementary relationship condition of any video object (such as video objects to be added instead of video object 103 or 107) or remain unchanged.

Figure 9:
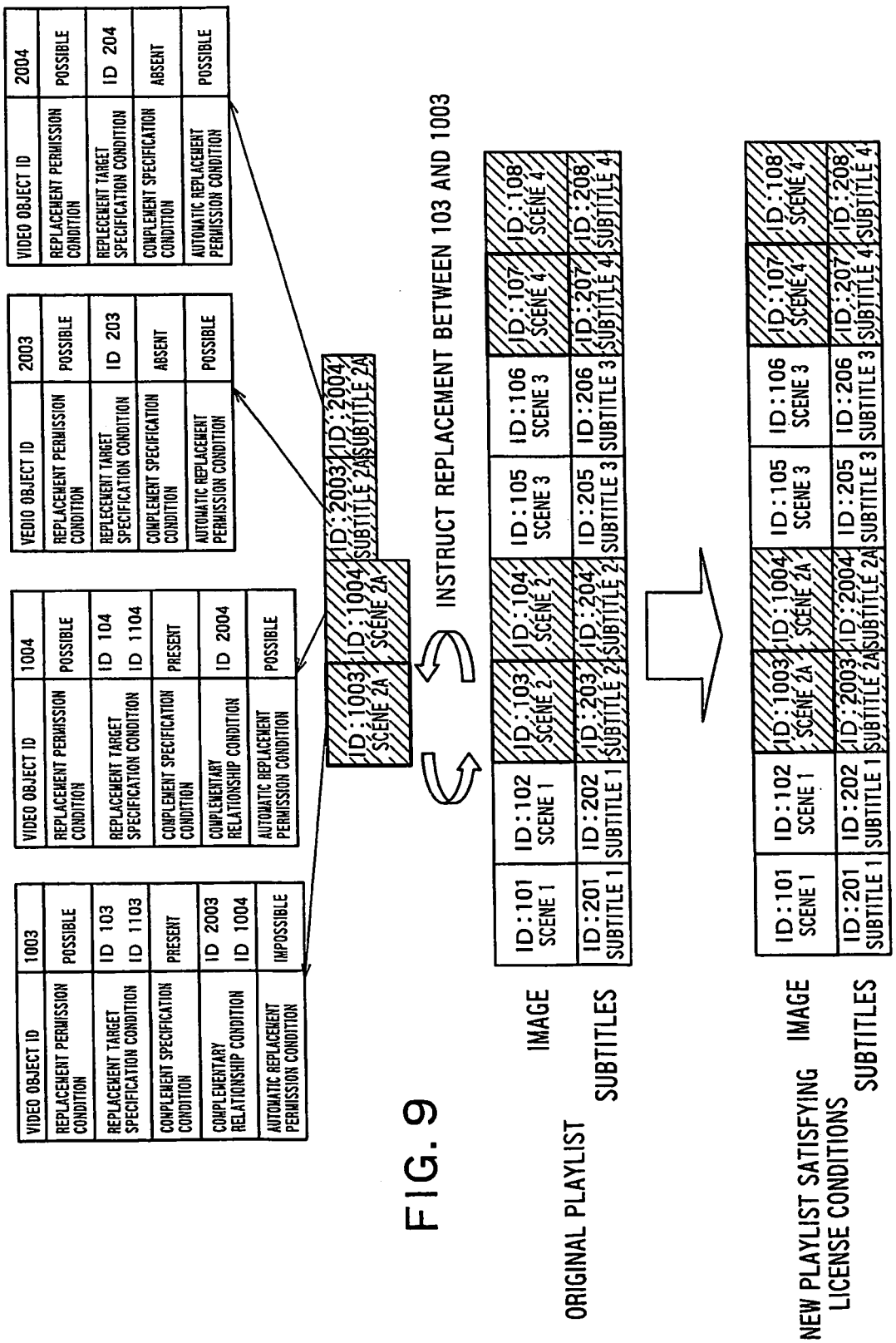
FIG. 9 illustrates an example of playlist modification (Example 1)

FIG. 9 illustrates an example of playlist modification (Example 1).

Here, assume that the user instructed to replace a video object 103 by a video object 1003. Then, the processing by the license verification unit 212 and the playlist modification instruction creator 206 results in an instruction to change video objects 104 and 203 in the original playlist to video objects 1004 and 2003 that must be used in conjunction to use a video object 1003 (see S807, YES in S808 of FIG. 7). Furthermore, an instruction is made to change video object 204 in the original playlist to a video object 2004 that must be used in conjunction (see S807, YES in S808 of FIG. 7). As a result of the above, a new playlist is created in which the four video objects 103, 203, 104, 204 in the original playlist are replaced by the video objects 1003, 2003, 1004 and 2004 respectively.

Figure 10:
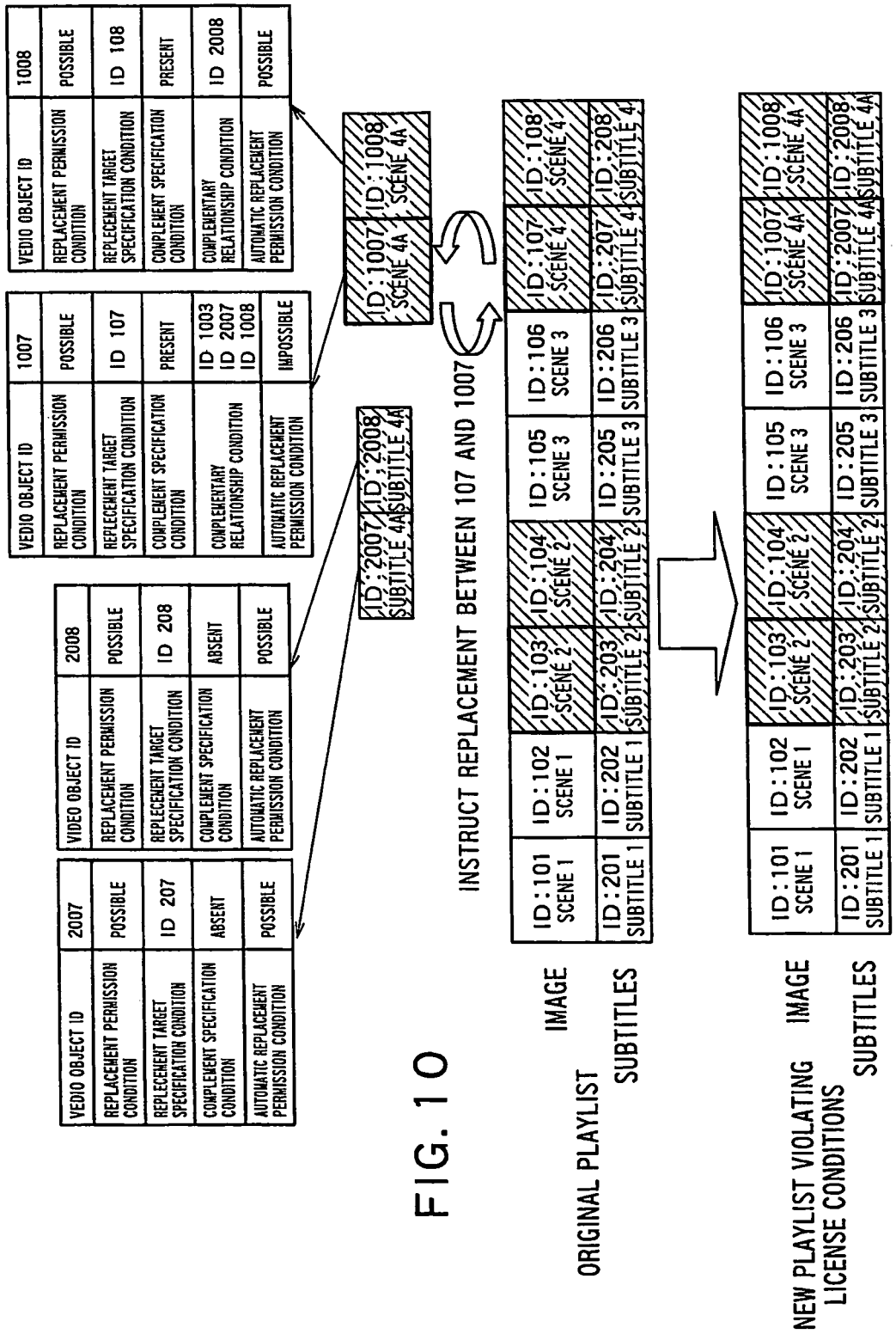
FIG. 10 illustrates an example of a failure of playlist modification (Example 2)

FIG. 10 illustrates an example of a failure of playlist modification (Example 2).

Here, assume that a user instructed to replace a video object 107 by a video object 1007. In this case, whether changes to video objects 1003, 1008 and 2007 that must be used in conjunction to use the video object 1007 are possible is checked (see S807 in FIG. 7). Because among some scenes the consistency in terms of story must be maintained for example, complement specification of video objects between such temporally separated scenes (here, between scene 2 and scene 4) may be made. As a result of the check, because no instruction to replace the video object 103 has been made by the user, violation of the license condition occurs when replacing the video object 103 by the video object 1003 (the automatic selection specification condition of the video object 103 is impossible) and the creation of a new playlist is refused (see NO in S808 of FIG. 7). That is, in determining whether to permit replacement of the video objects based on the replacement permission condition, replacement target specification condition and automatic selection specification condition, the replacement is determined impossible. Incidentally, the modification instruction table of FIG. 11 indicated above corresponds to the example of FIG. 10.

In this example, if user simultaneously instructed to replace video object 103 by video object 1003, the license condition (usage rule) could be satisfied.

Thus, editing to create new digital content by replacing some of content parts making up the original digital content by other content parts by user's operations can be achieved in a simple manner, while maintaining the original intentions of content authors (integrity of content) to a certain degree.

[Second Embodiment]

A content protection standard for next generation read-only optical disks such as HD DVD (High Definition Digital Versatile Disc) is defined in "AACS HD DVD and DVD Pre-recorded Book revision 0.91". In the standard, a mechanism is disclosed in which content stored in an unrewritable medium is not only faithfully played back simply in a prescribed way of playback but also is played back in a different way of playback by downloading playback control information of content or usage conditions of content. In the following, as an example relevant to the protection standard, digital content playback apparatus in which secondary content is created and played back from digital content recorded in HD DVD, etc. which is of the next generation optical disk standard will be described.

Figure 15:
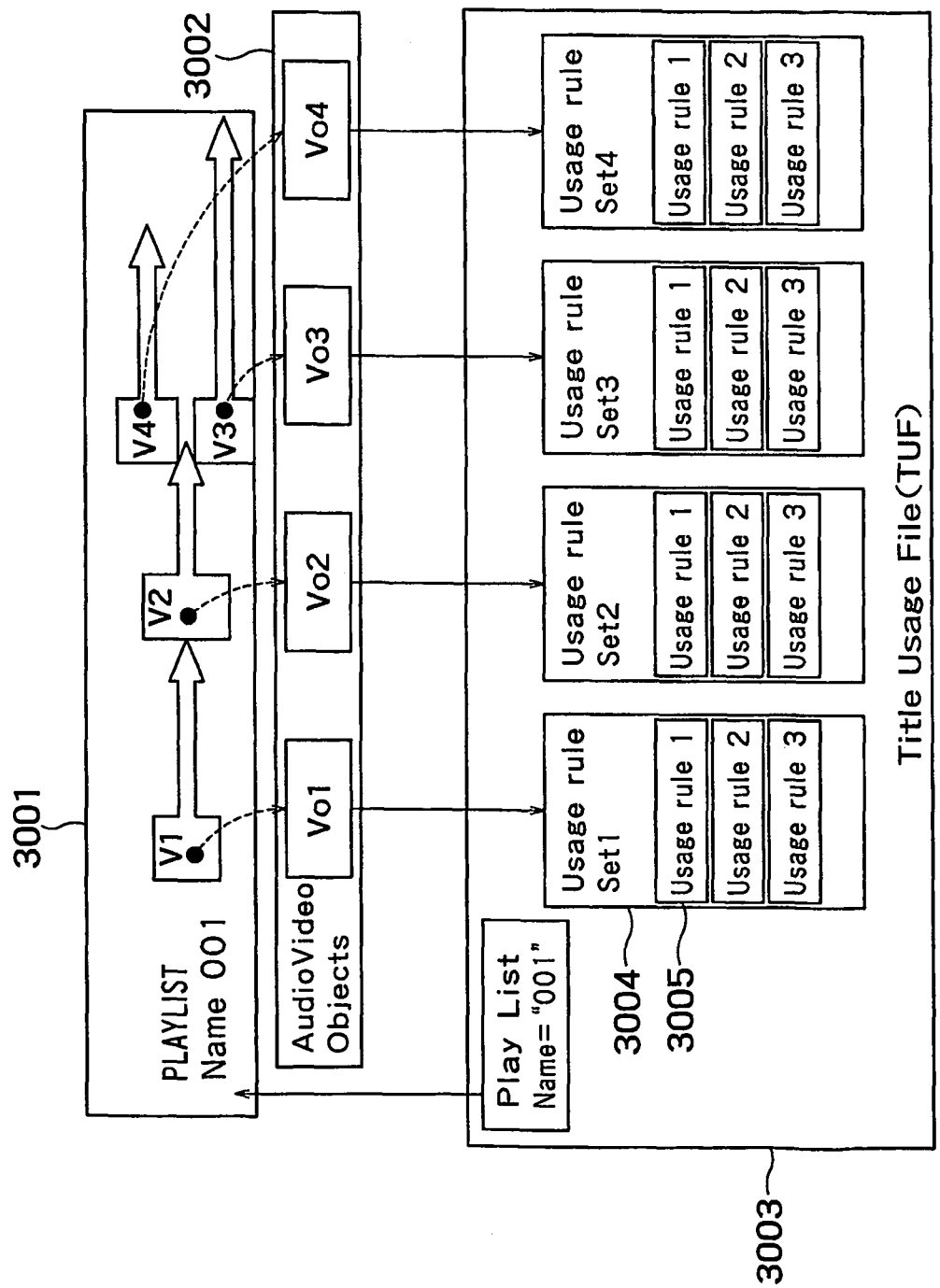
FIG. 15 illustrates an example of a data structure of content.

FIG. 15 illustrates an overview of a content format of HD DVD. In next generation optical disks, control information such as playback order or arrangement of content parts, referred to as a playlist 3001 is described. In this playlist 3001, information on links to content parts to be played back is described. Each content part contained in a group of content parts 3002 linked from the playlist 3001 is linked to respective usage rule sets. A usage rule set includes 0 or more usage rules (license information) and in each usage rule, detailed conditions (license conditions) are described. Usage rules can be described in a rights expression language such as MPEG-21 REL, for example. Each usage rule set is a component of a license file (Title Usage File: TUF) 3003 prepared per-playlist basis. In the TUF 3003, a unique playlist name ("001" in this example) is described, which allows unique identification of correspondence between a playlist and a TUF. For example, in the playlist "001", initially a content part Vo1 linked from an element V1 is played back but prior to executing the playback, a usage rule 1 to 3 contained in a usage rule set 1 associated with content part Vo1 is verified.

For next generation optical disks, it has become possible to play back content different from content stored on the same disk by newly downloading from a network a playlist and a corresponding TUF other than those stored in the same disk and binding the downloaded playlist and TRU to content parts stored on the disk.

However, from the perspective of alteration prevention, a step is taken to prohibit downloaded playlists and related TUFs from being modified. Such a prohibition step is taken because of the fact that no mechanism is provided to impose certain constraints such that editing is made only within the scope that is not against content holder's intentions. Such a prohibition step contributes to hindrance of diversification of content business using single-source and multi-use source which has become increasingly demanded recently. For example, even applications are forbidden that can be realized by making only some modifications to a playlist representing whole playback control information while utilizing content parts, such as replacement of order to play back education content according to the progress of class lessons or using film content to create music video clips for sound-track with animation background according to user preference.

One of the major characteristics of this embodiment is to realize functions that enable editing within the scope of content holder's intentions by including on a medium such as a next-generation read-only optical disk in:

1) Identification information identifying the set of a playlist template (edit playlist) and a default TUF that permits content parts in the medium to be imported;

2) Information that specifies content parts by using link references etc. as a way to import content parts in the medium to the edit playlist; and 3) Information that specifies how to import contents that have complementary relationship described above when importing, obtaining the above set based on the above identification information, editing the edit playlist within the scope that satisfies the usage rules contained in the default TUF and binding the default TUF to the edit playlist.

In the default TUF, usage rules for content parts that may be used in a playlist newly created from the template (edit playlist) are described. This prevents content parts from being played back when the content parts that were not intended by the content holder are imported to the playlist because of the absence of the usage rules.

Figure 13:
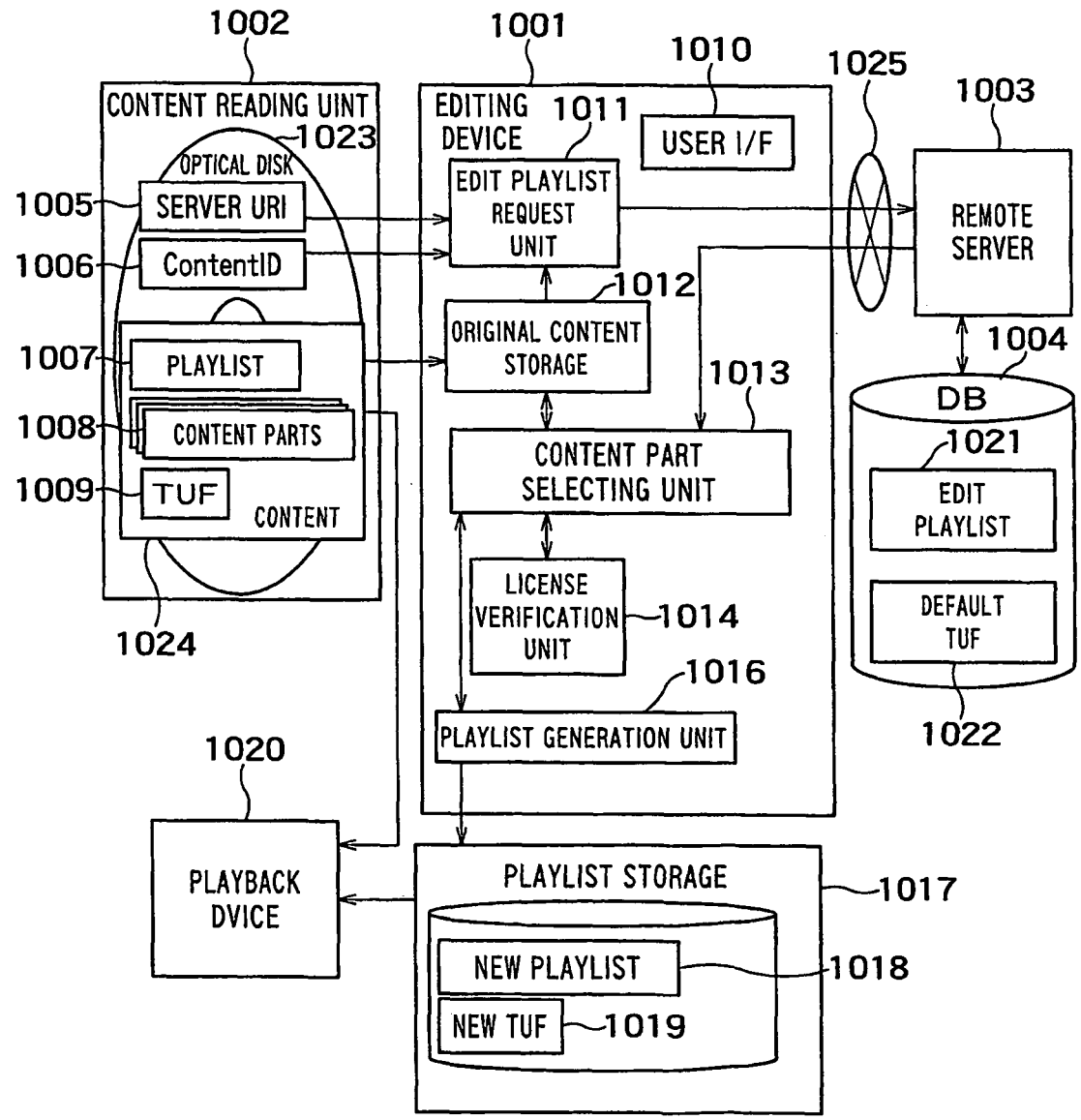
FIG. 13 is a functional block diagram illustrating the entire configuration of Example 2.

FIG. 13 is a functional block diagram illustrating the entire configuration of digital content playback apparatus according to the second embodiment of the invention. As illustrated in FIG. 13, this digital content playback apparatus includes an editing device 1001, a content reading unit 1002, a playlist storage 1017 and a playback device 1020. The digital content playback apparatus is connected to a remote server (external server) 1003 via a network 1025. To the remote server 1003, a database 1004 is connected.

The editing device 1001 has a function of generating new playlists. The editing device 1001 includes a user I/F 1010, an edit playlist request unit 1011, an original content storage 1012, content part selecting unit 1013, license verification unit 1014 and a playlist generation unit 1016.

The content reading unit 1002 has a function of providing data that serves as materials. In an optical disk 1023 from which the content reading unit 1002 performs reading, a server URI 1005 representing the URI (Uniform Resource Identifier) of the remote server 1003, ContentID 1006 identifying content 1024 and the content 1024 are recorded. The content 1024 includes a playlist 1007, a plurality of content parts 1008 and a TUF (Title Usage File) (first license file) 1009.

The remote server 1003 has a function of retrieving necessary data from the database (DB) 1004 upon request of the editing device 1001, and sending it to the editing device 1001. In the DB 1004, an edit playlist 1021, and a default TUF (second license file) 1022 are stored.

The playlist storage (p-storage) 1017 has a function of permanently storing the playlists generated in the editing device 1001 as a new playlist 1018 and the default TUF as a new TUF 1019.

The playback device 1020 has a function of reading necessary information for content playback from the content reading unit 1002 and playlist storage 1017 and making playback. That is, the playback device 1020 reads the new playlist 1018 and new TUF 1019 from the playlist storage 1017 and sequentially plays back the content parts in the optical disk 1023 according to the new playlist 1018. At the time of playback, it is determined whether each content part satisfies the license conditions described in each usage rule in the respective usage rule sets contained in the new TUF 1019 and if it does not satisfy, the playback of each content part is not performed. The playback device 1020 also reads the playlist 1007 and TUF 1009 from the content reading unit 1002 and sequentially plays back content parts in the optical disk 1023 according to the playlist 1007. At the time of playback, it is determined whether each content part satisfies the license conditions described in each usage rule in the respective usage rule sets contained in the TUF 1009 and if it does not satisfy, the playback of each content part is not performed.

Figure 14:
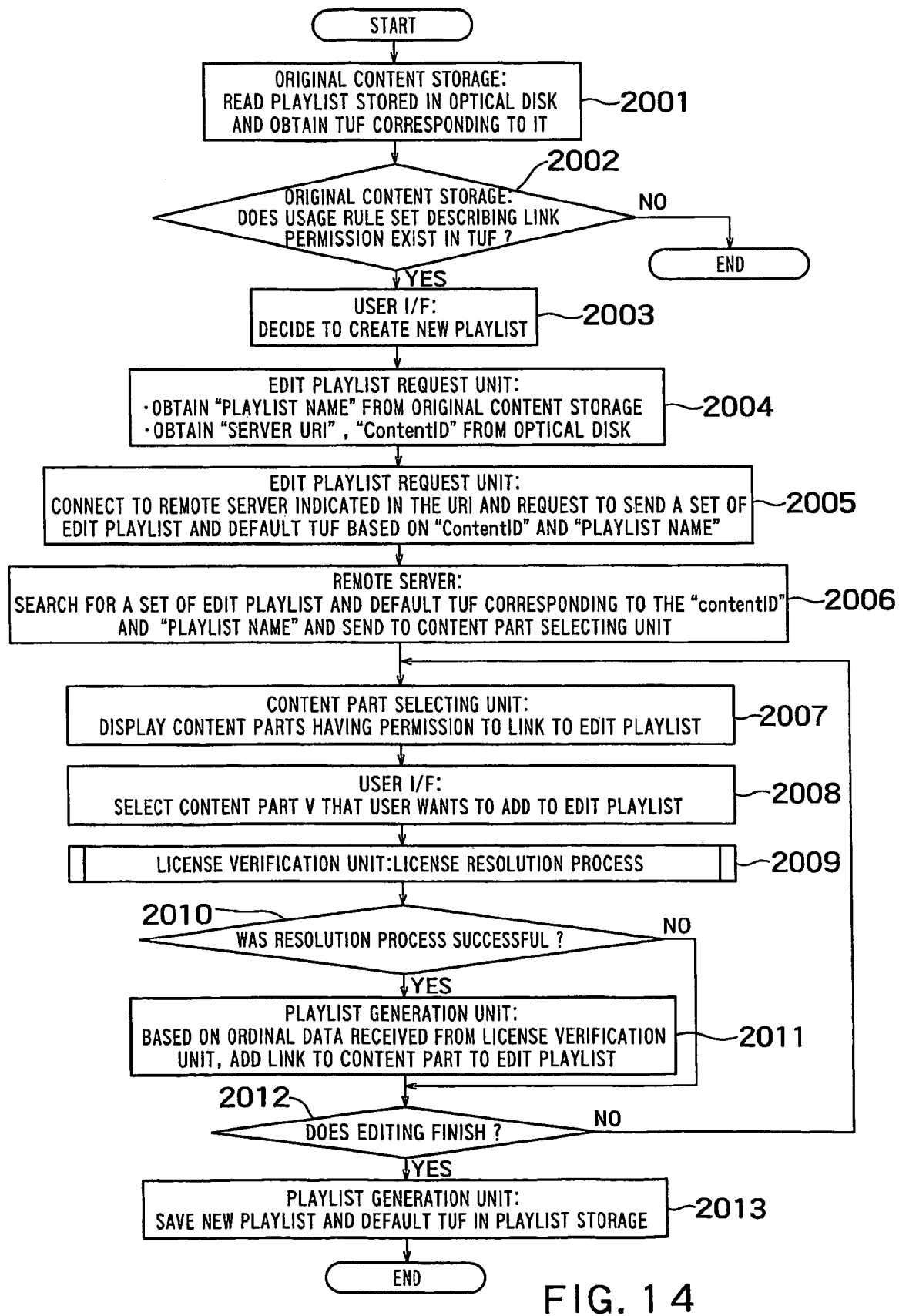
FIG. 14 is the entire flowchart of Example 2.

FIG. 14 is a flowchart illustrating the flow of the entire processing by the digital content playback apparatus in FIG. 13.

When the user starts the editing device 1001, the original content storage 1012 reads the playlist 1007 recorded in the optical disk 1023 and obtains the TUF 1009 corresponding to the playlist 1007.

Then, the original content storage 1012 verifies whether a usage rule set describing permission to link to a new playlist exists in the obtained TUF 1009 (2002), and if it does not exist (NO in 2002), the process is terminated.

Otherwise, if a usage rule set describing the link permission exists in the TUF 1009 (YES in 2002), a decision is made to create a new playlist based on a user input via the user I/F 1010 (2003).

The edit playlist request unit 1011 receives the name of a playlist read by the content reading unit 1002 from the original content storage 1012 (2004). The edit playlist request unit 1011 also obtains a server URI 1005, a ContentID 1006 from the optical disk 1023 via the content reading unit 1002 (2004).

Note that a ContentID refers to information to identify digital content, and for example, an ID identifying a package or an ID combined with a disk serial number to enable to identify even an individual disk may be used.

The edit playlist request unit 1011 connects to the remote server 1003 indicated in the obtained server URI and send a massage requesting to send a set of a edit playlist (for example, an empty playlist) and a default TUF, corresponding to the ContentID and playlist name (2005).

The remote server 1003 searches for the set of the edit playlist and its default TUF, corresponding to the ContentID and playlist name and sends to the content part selecting unit 1013 (2006).

The content part selecting unit 1013 presents the user content parts having a usage rule set which includes permission to link to the edit playlist (2007).

The user selects content part V that the user wants to add to the edit playlist from the presented content parts (2008).

The license verification unit 1014 identifies a usage rule describing link permission in the usage rule set contained in the TUF 1009, verifies a usage condition (described below) for the operations of the content part and performs a resolution process to satisfy the usage condition (2009). The details of the specific processing will be described in a third embodiment, but the processing described in JP-A 2006-099645 (KOKAI) related to a prior application of the applicant may be used. The JP-A 2006-099645 (KOKAI) is not disclosed in priority date of the present application. In this JP-A 2006-099645 (KOKAI), for compound content including a plurality of content parts, a method is proposed that protects the minimum configuration intended by the original author by describing in a usage rule a usage condition representing the maintenance of the following relationship (1) and (2) which is constraint relation between content parts that should be complied with when reusing content parts.

(1) Complementary relationship: The relationship enforcing the reuse of other specified contents when one content part is reused; and (2) Exclusive relationship: The relationship forbidding the reuse of other specified contents when one content part is reused.

If in process 2009, the resolution process succeeds (YES in 2010), the playlist generation unit 1016 receives ordinal data (that describes ordinal relation of content parts necessary for generating a playlist. The details will be described below) from the license verification unit 1014 and links to the content parts are added to the edit playlist (2011).

The processing from process 2007 to 2011 is repeated until the editing ends (NO in 2012).

When the editing has all completed (YES in 2012), the playlist generation unit 1016 saves the playlist finished being edited and the default TUF corresponding to the playlist in the playlist storage 1017 as a new playlist 1018 and a new TUF 1019 (2013).

FIG. 16 illustrates an example of the data structure of the playlist in FIG. 15 described in XML format.

In FIG. 16, a playlist named "001" describes that content parts are played back in order of Vo1, Vo2 and subsequently Vo3 and Vo4 are played back in a synchronized manner. Vo1 to Vo4 include still images, animation, audio data, etc. as content parts that will be actually played back as well as metadata (not shown) such as identification information of the corresponding usage rule set.

FIGS. 17A and 17B illustrate examples of "the conditions for a making-link operation" described in MPG-21 REL format, as the usage rules depicted in FIG. 15.

In MPG-21 REL, a usage rule (grant) includes "a license holder (principal)", "a permitted operation (right)", "target content (resource)" and "a usage condition" (a condition for link permission) as major components.

FIG. 17A describes that a license holder 5001 is granted to do a "beLinked" operation (permitted operation 5002) to the content part "Vo3" (target content 5003), which is an operation to enlist a link into a new playlist and the conditions for granting the link are included in a usage condition 5004. In MPG-21 REL, a usage condition can be generally expressed in a logical AND. In the example of FIG. 17A, the usage condition 5004 includes two individual condition of a term condition 5005 and a location specification condition 5006 for making links. The location specification condition 5006 is described as character string information showing a location to link that should be added to the edit playlist.

FIG. 17B illustrates an example in which it is also permitted to do a "beLinked" operation to the content part "Vo2". The usage condition is further subject to a constraint of simultaneously importing the content part "Vo4" when enlisting a link to the "Vo2" (complementary relationship condition 5007). In this example, as a temporal constraint, "Vo4" is specified as "before" such that it is played back before "Vo2". Also as a way of importing to the playlist, a "link" type is specified, that is, it is described that links are made like "Vo2".

FIG. 18 illustrates an example of the usage rule which is a component of the default TUF 1022 in FIG. 13, described in MPEG-21 REL format. Here is described the contents of a permission of an operation in which a content part is played back as a part of a new playlist. In the example of FIG. 18, the "play" operation is described that permits content playback for "Vo2".

Note that in a default TUF, usage rules only for content parts that may be used in a newly created playlist are described. This prevents from content parts that are not intended by the content holder from being played back even if the content parts are imported to the playlist since any usage rule corresponding to the content parts does not exist and the content holder can effectively limits the materials used by users.

Figure 19:
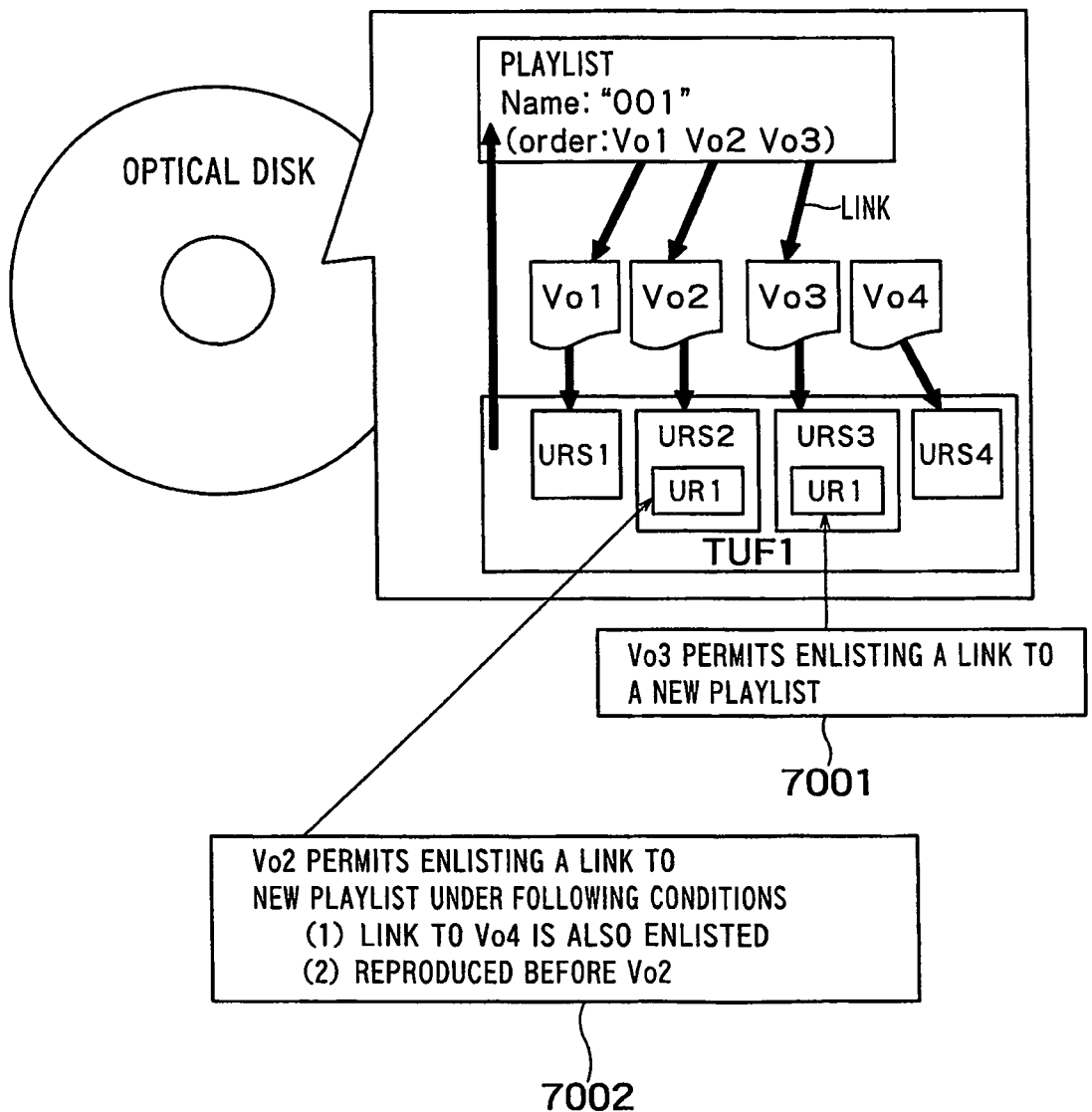
FIG. 19 is an image illustrating a case of the usage rule in the second embodiment.

FIGS. 19 and 20 are diagrams illustrating examples of actual execution of editing.

In FIG. 19, in an optical disk, a playlist named "001", content parts Vo1, Vo2, Vo3, Vo4, and "TUF 1" including usage rule sets, URS1, URS2, URS3 and URS4 together corresponding to each content part are stored. In the playlist "001", links are made between each element in the playlist and a content part corresponding to each element such that the playback is performed in order of Vo1, Vo2, Vo3. The usage rule of Vo2, (UR1) is stored in URS (usage rule set) 2 and in the UR1, there is a description 7002 which has the following meanings (see FIG. 17B for the actual description):

Vo2 permits enlisting a link to a new playlist under the following conditions (1) and (2):
(1) Link to Vo4 is also enlisted; and
(2) Vo4 is played back prior to Vo2.

Also, the usage rule (UR1) of Vo3 is stored in URS3 and in UR1, there is a description 7001 which has the following meanings (see FIG. 17A for the actual description):

Vo3 permits enlisting a link to a new playlist.

FIG. 20 illustrates a scenario which runs when a new playlist is created by using an optical disk which includes what is depicted in FIG. 19. That is, Step 1: Playlist editing is started with an edit playlist (empty playlist) and a default TUF, received from the remote server 1003;

Step 2: Content parts Vo2, Vo3 that can be added to the playlist are presented;

Step 3: Vo2 is selected as a content part which the user wants to add to the playlist;

Step 4: In order to satisfy conditions for the link permission for Vo2, Vo4 is searched for and the usage rule of Vo4 is evaluated (assuming that conditions such as a term are satisfied). As a result of the evaluation, a playlist which is adjusted to play back in order of Vo4, Vo2 is created and links are made between each element in the playlist (order: Vo4, Vo2) and each content part Vo4, Vo2; and Step 5: The new playlist and default TUF are saved in the playlist storage.

Thus, by using content parts stored in an optical disk a new playlist which permits only the playback as a whole is generated. For example, this enables to create such things as music video clips principally intended for film music playback according to user preference by using content parts in an optical disk that originally records films as materials.

Also, from the perspective of protection and use of content, the effect can be obtained that allows the user to create a playlist that can refer to unrewritable content stored in an optical disk as well as allowing the creation to be limited to the scope that does not go against the content holder's intentions.

[Third Embodiment]

Figure 21:
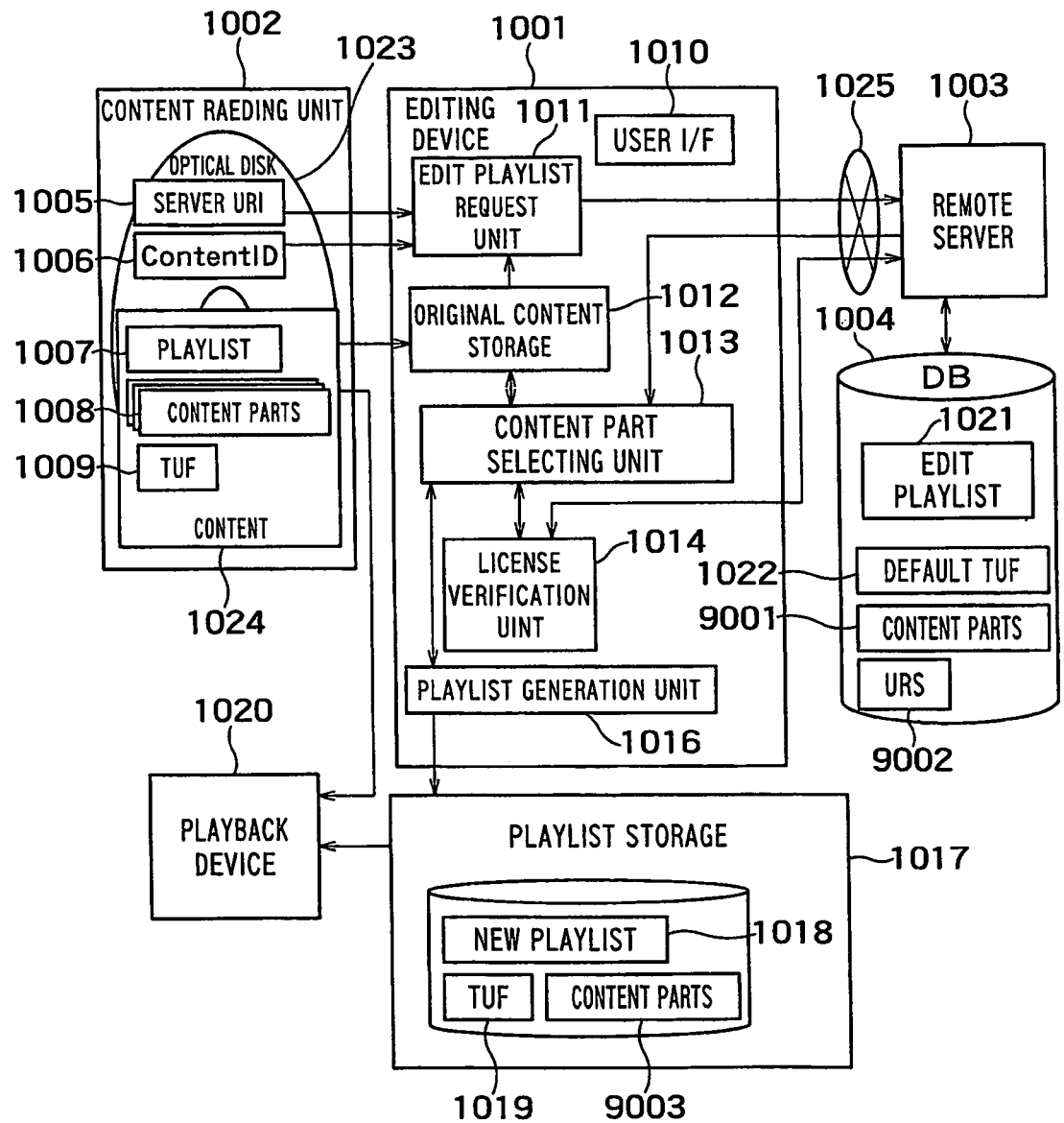
FIG. 21 illustrates functional blocks depicting the entire configuration of the third embodiment.

FIG. 21 is a functional block diagram illustrating the entire configuration of digital content playback apparatus according to the third embodiment. The same numerals are given to the elements which have the same name as those of the configuration illustrated in FIG. 13 in the second embodiment. In addition to the configuration in FIG. 13, a new content part 9001 that does not exist in an optical disk and a usage rule set 9002 that includes the usage rule of the content are stored in a database 1004. This assumes for example, the case in which there exists in the usage rules of the content parts in an optical disk a description defining as a condition to permit links that content parts present in the database 1004 must also be linked from a new playlist. Therefore, in FIG. 21, a license verification unit 1014 requests content retrieval for a remote server 1003 via a network 1025. When linking to a content part external to a terminal (digital content playback apparatus), in most cases, the content part is downloaded to the terminal, and a link to the location to which it was downloaded is enlisted. In this case, a content part in the database 1004 need to be copied as a content part 9003 to a playlist storage 1017. But it is also possible to write a description in usage rules of content parts of an optical disk that includes making direct link to an external site as a condition.

FIG. 22 illustrates an example of a usage rule included in the TUF 1009 depicted in FIG. 21, described In MPEG-21 REL format that permits an enlisting operation.

In FIG. 22, for the content part "Vo2", a "beLinked" operation is permitted. As a usage condition, a constraint (complementary relationship condition 10001) is imposed that when linking to "Vo2", a content part "Vo5" should be simultaneously imported to the playlist. In this example, as a temporary constraint, "before" is specified such that "Vo5" is played back before "Vo2". Also, as a way to import to a playlist, a "store_and_link" type is specified. That is, it is described that "Vo5" is saved in a local storage (p_storage) and an enlisting a link is made to the location where it is saved. Here, Vo5 exists in http://www.vod.com/0001/001/ADV_OBJ/Vo5/ and Vo5 is downloaded from this URI. The location where the downloaded Vo5 is saved is file:///p_storage/ADV_OBJ/Vo5/ .

Note that though as a way to import a content part, a way to import by link is described herein, in addition to that, a way of importing a copy of content part directly to the playlist, a manner of specifying a conversion method (for example, reduction in resolution) in case of streaming playback or local copying can be also considered, therefore, invariables representing them may be further defined. Also in case of importing as "link", if the address of the content part and the URI of the location to link to are the same, the element of <resourceLocator> indicating the location to link to (in FIG. 22, <resourceLocator name="file:///dvddisc/ADV_OBJ/Vo2"/> immediately above 10001) may be omitted.

Figure 23:
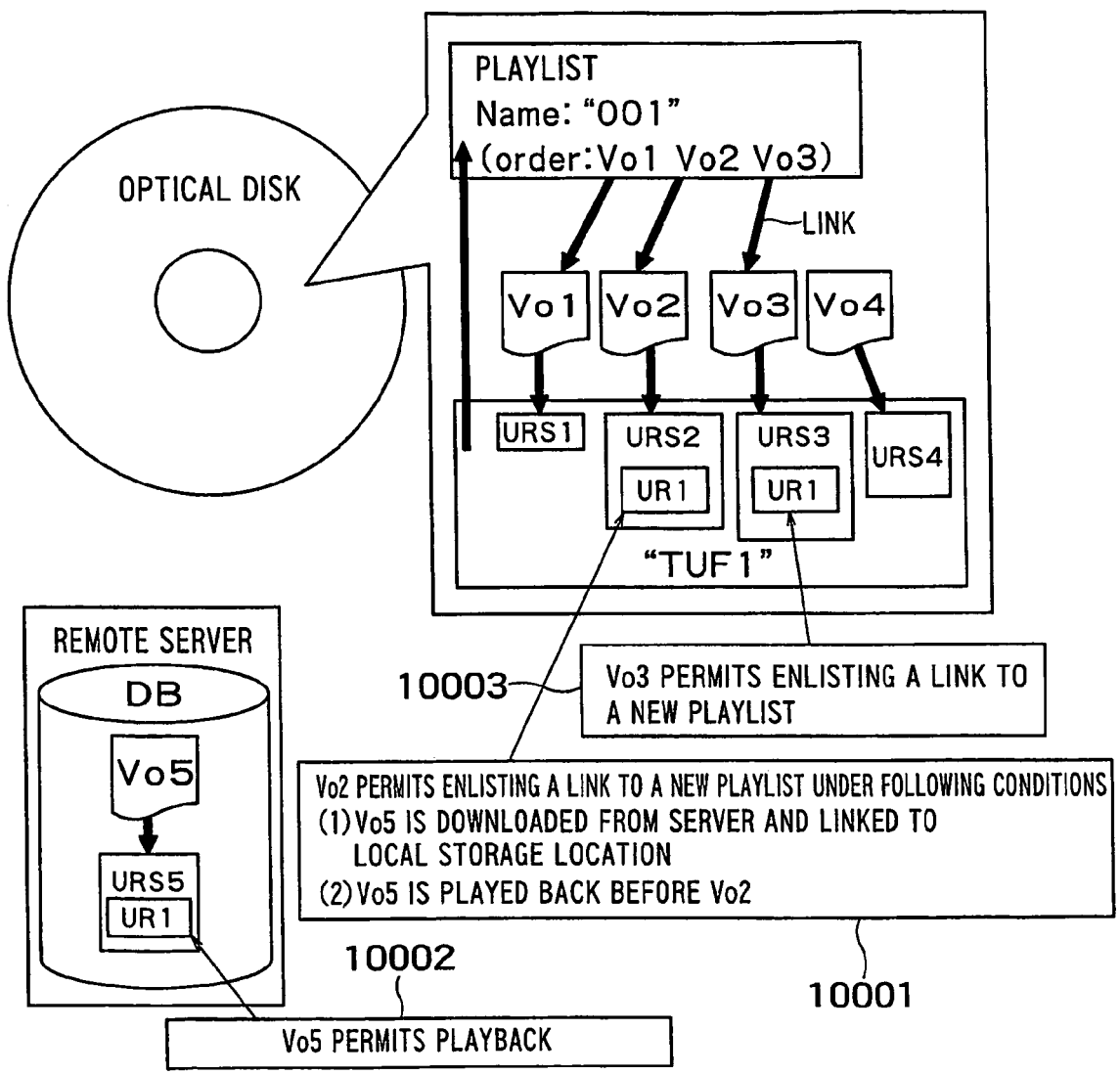
FIG. 23 illustrates a case of the usage rule in the third embodiment.

FIGS. 23 and 24 are diagrams illustrating examples of actual execution of editing.

In FIG. 23, in an optical disk, a playlist named "001", content parts Vo1, Vo2, Vo3, Vo4 and "TUF 1" that includes usage rule sets URS1, URS2, URS3, URS4 together corresponding to each content part are stored. In the playlist "001", links are made between each element Vo1, Vo2, Vo3 in the playlist and content part corresponding to each element such that it is played back in order of Vo1, Vo2, Vo3. The usage rule of Vo2 (UR1), is stored in the URS2 and in the UR1, there is a description 10001 which has the following meanings (see FIG. 22 for the actual description):

Vo2 permits enlisting a link to a new playlist under the following conditions:
(1) Vo5 is downloaded from a remote server and a link is enlisted to a local location to save to; and
(2) Vo5 is played back before Vo2.

Also, the usage rule of Vo3 (UR1) is stored in URS3 and in UR1, there is a description 10003 which has the following meanings (see FIG. 17A for the actual description):

Vo3 permits enlisting a link to a new playlist.

On the other hand, the usage rule of Vo5 is stored in a remote server and there is a description 10002 which has the following meanings:

Vo5 permits playback.

FIG. 24 illustrates a scenario which runs when a new playlist is created by using an optical disk which includes what is depicted in FIG. 23. That is, Step 1: With an empty playlist (edit playlist) and a default TUF received from the remote server 1003, playlist editing is started;

Step 2: Content parts Vo2, Vo3 that can be added the playlist are presented;

Step 3: Vo2 is selected as a content part which the user wants to add;

Step 4: In order to satisfy conditions for the link permission for Vo2, Vo5 is downloaded. A playlist which is adjusted to play back in order of Vo5, Vo2 is created and links are made between each element of the playlist (order: Vo5, Vo2) and each content part Vo5, Vo2;

Step 5: URS5 is downloaded to the playlist storage and URS5 is added to the default TUF; and Step 6: The new playlist, default TUF and content part Vo5 are saved in the playlist storage.

Figure 25:
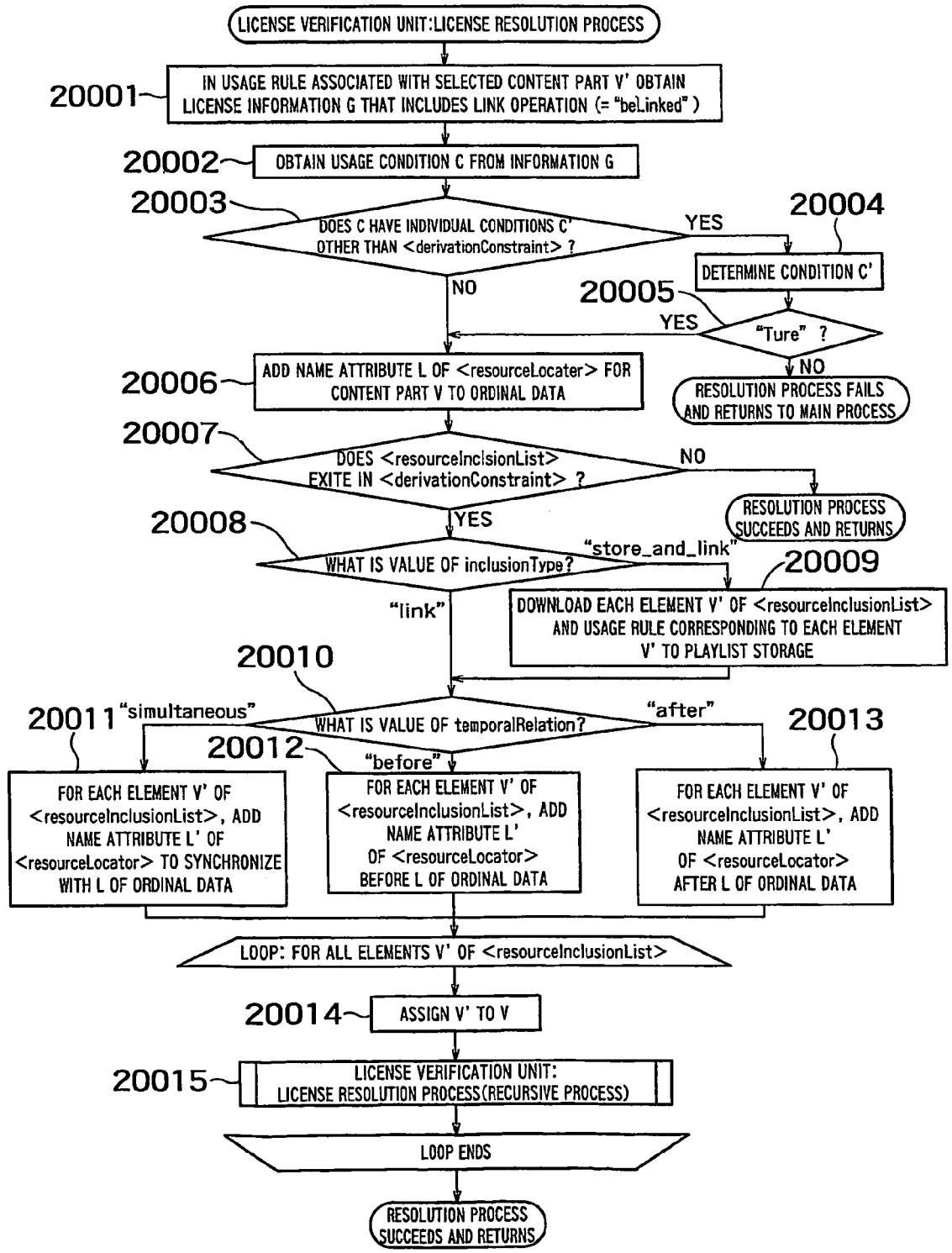
FIG. 25 is a flowchart illustrating the detail flow of the license resolution process.

FIG. 25 is a flowchart illustrating the flow of the processing executed in the license resolution process 2009 in FIG. 14. In this example, assuming the data depicted in FIGS. 17A, 17B and 22, the consistency of data element names and others is maintained.

First, among the usage rules that are associated with a selected content part V, a usage rule (license information) G that includes an enlisting operation (="BeLinked") is obtained (20001).

Then, from the license information G, a usage condition C is obtained (20002), and if the usage condition C include an individual condition C' other than <derivationConstraint> (YES in 20003), a condition determination on C' is made (20004). This condition determination is a determination on a condition such as an individual condition 5005 in FIG. 17A for example that limits the available period. The determination includes for example, obtaining information from a timer in the device and comparing the obtained information with the condition. In MPEG-21 REL, a variety of individual conditions and ways of their determination are defined and using them enables more flexible descriptions.

If in the process 20004, a negative determination is made (NO in 2005), the usage condition is not satisfied, the process is terminated.

On the other hand, if in the process 20004, an affirmative determination is made (YES in 2005), the Name attribute L of <resourceLocator> about the content part V is added to an ordinal data (20006). Here, the ordinal data refers to data describing ordinal relation necessary to generate a playlist. For example, the ordinal data to generate the example of FIG. 16 is written in Lisp-type list format as follows:

(Vo1 Vo2 (Vo3 Vo4))

Then, whether <resourceInclusionList> exists in <derivationConstraint> is checked (20007), if it does not exist (NO in 20007), the resolution succeeds and the process terminates.

On the other hand, if <resourceInclusionList> exists (YES in 20007), it further proceeds to the next process.

First, the value of inclusionType attribute is checked (20008) and if the value shows a type that locally makes a copy and enlists a link to the copy as illustrated in FIG. 22 ("store_and_link" in 20008), then each element V' of <resourceInclusionList> and the usage rules corresponding to each element V' are downloaded to the playlist storage (20009) to proceed to the next.

If the value of inclusionType attribute is the type of link illustrated in FIG. 17B ("link" in 20008), it proceeds to the next without downloading.

The attribute value of temporalRelation is checked (20010) and if the value is "simultaneous" signifying synchronization ("simultaneous" in 20010), as for each element V' of <resourceInclusionList>, the Name attribute L' of <resourceLocator> is added to be synchronized with L of the ordinal data (20011).

Also, if the attribute value is "before" that requests to play back before ("before" in 20010), then as for each element V' of <resourceInclusionList>, the Name attribute L' of <resource locator> is added before L of the ordinal data (20012).

Also, if the attribute value is "after" that requests to play back after ("after" in 20010), then as for each element V' of <resourceInclusionList>, the Name attribute L' of <resource locator> is added after L of the ordinal data (20013).

In the meantime, for content parts listed in <resourceInclusionList>, respective usage rules (license conditions) naturally exist. Therefore, for each element V', it is necessary to similarly perform the process 20001 to 20013. So, for all elements V' of <resourceInclusionList>, assign V' to V (20014), and the license resolution process 2009 is recursively performed (20015). In the series of processes described above, only when an affirmative determination is made on the usage conditions of all content parts, the entire resolution process is successful.

Thus, by using content parts stored in an optical disk and content parts existing in a remote server, a new playlist can be generated which permits only the playback as a whole. For example, this enables to insert movie trailers when content parts of an optical disk that originally records films are reused.

Though in the third embodiment above, a case in which new content parts exist in a remote server has been described, database may be actually distributed in a number of locations and moreover, the distribution may be made per ContentID basis or per data-type basis.

Also, as an implementation of the embodiment, it is possible that the functions of an editing device can be realized as application services in a remote server and in that case, a terminal (digital content playback apparatus) may only include a content reading unit, a playlist storage and a playback device and may be also manufactured as a low-priced terminal.

Besides, it is also possible to run at off-line (not via network) by recording edit playlists and default TUFs in an optical disk.

[Fourth Embodiment]

In the second and third embodiment, a new playlist is created by obtaining an empty edit playlist and adding links to selected content parts to this playlist. On the other hand, in this embodiment, a case will be described where a playlist which is not empty is copied for editing and this is used as a template to create a new playlist. The entire configuration of the functional blocks of this embodiment is the same as that of second or third embodiment and the procedure of exchanging information with a remote sever is also basically the same as that of second or third embodiment. In the following, only the difference from second or third embodiment will be described using figures.

Figure 26:
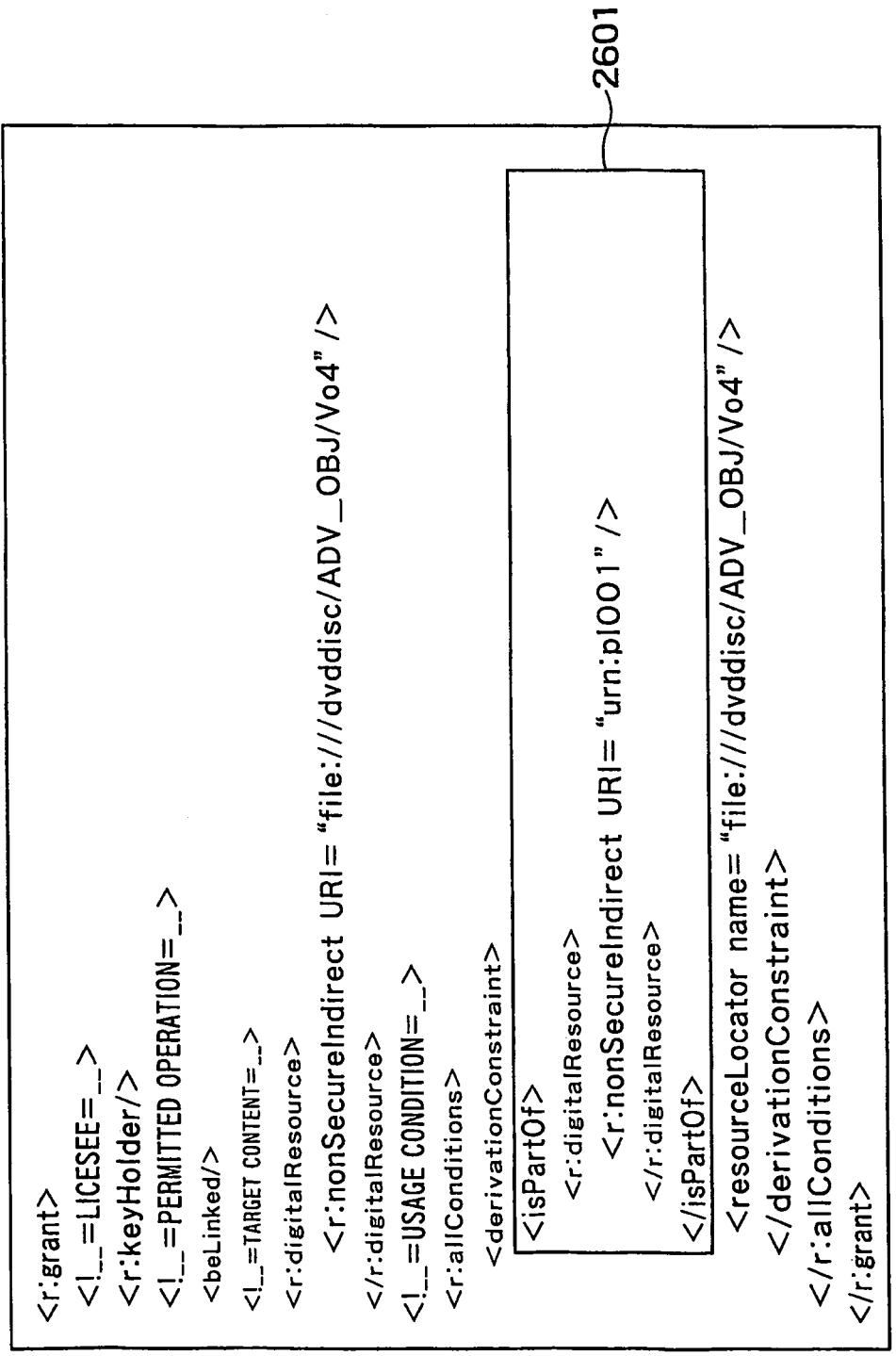
FIG. 26 illustrates an example of description of a usage rule.

FIGS. 26 and 27 illustrates examples of a usage rule including "name information identifying a playback control edit script (edit playlist) being referred to" described in MPEG-21 REL format.

In FIG. 26, the licensee is permitted to do a "belinked" operation that enlists a link to a playlist pl001 to a content part Vo4. Here, a description part 2601 that is sandwiched between "isPartOfs" corresponds to the "information identifying a playback control edit script (playlist) to be referred to". This description indicates that links other than those made from the playlist with a specific name pl001 are not permitted. For example, from a newly obtained playlist with another name, any link to the content part Vo4 can not be made. The ways of describing for identifying playlists may include various ways such as description of IDs or file names or description of URLs.

When copying an already prepared (not empty) playlist to edit via the remote server 1003 and using this as a template to create a new playlist, rules for uniquely determining the name of the edit playlist are preset. For example, a version number is added to the name of the original playlist. Moreover, it is also possible to identify by expressing a part of a name or ID in a standard expression and finding a character string matching to the playlist to be created. For example, if identifying an playlist "pl00v*" with "isPartOf", all of the playlists derived and created from the original playlist such as "p100v1", "p100v2" may be considered to be the playlists that satisfy the conditions. In addition, a copied edit playlist with a predetermined name or ID may be prepared.

In FIG. 27, the licensee is granted a right of a "beCut" operation that delists a link to a content part Vo2 that is already linked from the playlist pl001 and stops the use of Vo2. A description part 2701 sandwiched between "isPartOfs" corresponds to "the address information for identifying a playback control edit script (edit playlist) being referred to". This description indicates that any process other than deleting links from the playlist with a specific name pl001 which is located in a specific location is not permitted. For example, even if from a playlist other than pl001, the content part Vo2 is linked and redundantly used, it is not permitted to edit any playlist other than the above-mentioned pl001 to delete the content part Vo2.

In, FIG. 27, in addition, a condition for specifying content parts being candidates for replacement targets is described in a description part 2702 sandwiched by "replacementResourceList" that says if the content part Vo2 is not used, a content part Vo4 or Vo5 must be used instead of Vo2. Note that "beCut" is not necessarily limited to be used along with "replacementResourceList". Also both the "beLinked" operation to make links and the "beCut" operation to delete links to stop the use may be permitted.

FIG. 28 is a diagram illustrating an example of actual execution of editing. In an optical disk, the playlist named "pl001", content parts Vo1, Vo2, Vo3, Vo4 and "TUF 1" that includes usage rule sets URS1, URS2, URS3 and URS4 together corresponding to each content part are stored. In the playlist, links are already made such that it is played back in order of Vo1, Vo2, Vo3. It is assumed that in Vo2, the usage rule of FIG. 27 is specified and in Vo4, the usage rule of FIG. 26 is specified. The following is a basic procedure that is executed when editing a playlist:

Step 1: From the remote server 1003, an edit playlist that is copied for editing and a default TUF are received;

Step 2: Content part Vo2 that can be deleted in the playlist and Vo4, Vo5 that are candidates for replacing the content part Vo2 are presented;

Step 3: Vo2 is specified as a content part that is deleted in the playlist and Vo4 is specified as the candidate replacing the content part Vo2;

Step 4: Based on the conditions for permission to enlist link to Vo2, Vo4, change of links is enlisted to use Vo4 instead, in the places where Vo2 was used in the playlist; and Step 5: The new playlist and the default TUF are saved in the playlist storage.

The process of the link change of step 4 includes two kinds of processes of delisting a link to Vo2 and further enlisting a link to Vo4 instead in the same places in the playlist. Therefore, the replacement between Vo2 and Vo4 can not be made unless it is verified in the license verification unit 1014 that for Vo2, link deletion is permitted and for Vo4, link addition is permitted.

Note that the condition for specifying content parts which are candidates for replacement targets may also be specified along with the condition for simultaneously importing other content parts to the playlist described in second and third embodiment (complementary relationship condition). In this case, for the process of the license verification unit 1014, a similar process to that of the license resolution unit 205 of the first embodiment can be used.

Additional advantages and modifications will readily occur to those skilled in the art. Therefore, the invention in its broader aspects is not limited to the specific details and representative embodiments shown and described herein.

Accordingly, various modifications may be made without departing from the scope of the general inventive concept as defined by the appended claims and their equivalents.

The invention claimed is:

1. A digital content playback apparatus which generates new digital content by replacing one or more content parts included in digital content by one or more other content parts, the digital content playback apparatus comprising:

content storage configured to store a plurality of content parts, license information storage configured to store license information describing license conditions defined for the content parts, each of which includes at least a replacement permission condition and a replacement target specification condition among conditions in which the replacement permission condition defines that a content part which has replacement permission is replaceable by another content part, the replacement target specification condition specifies content parts which are replacement target candidates when the replacement permission condition is replaceable, a complementary relationship condition specifies another content part that must be contained in digital content when using the content part which has replacement permission, and an automatic replacement permission condition specifies whether to allow replacement of the content part which has automatic replacement permission without user instruction, a content part selecting unit configured to allow a user to specify a replacement source content part as a content part that should be replaced among content parts in the digital content including content parts in the content storage, and a replacement target content part as a content part for adding to the digital content for replacing the replacement source content part, verifying unit configured to verify whether license conditions of content parts in the digital content and the replacement target content part would be satisfied when replacing the replacement source content part by the replacement target content part, and automatically replace the content part to satisfy complementary relationship conditions of all content parts, a content generation unit configured to generate new digital content by replacing the replacement source content part by the replacement target content part when the license conditions are determined as being satisfied by the verifying unit, and a content playback unit configured to play back the generated new digital content, wherein the content part selecting unit presents to the user content parts whose replacement permission condition is replaceable and whose automatic replacement permission condition is impermissible as candidates for the replacement source content part among content parts in the digital content and content parts specified by replacement target specification conditions of the candidates for the replacement source content part as candidates for the replacement target content part.

2. The apparatus according to claim 1, wherein when replacing the replacement source content part by the replacement target content part, if a content part specified by the complementary relationship condition of a certain content part in digital content after the replacing is not contained in the digital content after the replacing, the verifying unit verifies whether there exists in the digital content a content part whose replacement target specification condition specifies the content part specified by the complementary relationship condition of the content part violating complementary relationship condition and whose automatic replacement permission condition is permissible and if such a content part exists, decides to replace the content part by the content part specified by the complementary relationship condition.

3. A digital content playback method which generates new digital content by replacing one or more content parts included in digital content by one or more other content parts, the method comprising:
   providing content storage configured to store a plurality of content parts, and
   license information storage configured to store license information describing license conditions defined for the content parts, each of which includes at least a replacement permission condition and a replacement target specification condition among conditions in which
      the replacement permission condition defines that a content part which has replacement permission is replaceable by another content part,
      the replacement target specification condition specifies content parts which are replacement target candidates when the replacement permission condition is replaceable and
      a complementary relationship condition specifies another content part that must be contained in digital content when using the content part which has replacement permission, and
      an automatic replacement permission condition specifies whether to allow replacement of the content part which has automatic replacement permission without user instruction,
   receiving, from a user, specification of a replacement source content part as a content part that should be replaced among content parts in the digital content including content parts in the content storage, and a replacement target content part as a content part for adding to the digital content for replacing the replacement source content part,
   verifying whether license conditions of content parts in the digital content and the replacement target content part would be satisfied when replacing the replacement source content part by the replacement target content part, and automatically replacing the content part to satisfy complementary relationship conditions of all content parts,
   generating new digital content by replacing the replacement source content part by the replacement target content part when the license conditions are determined as being satisfied as a result of the verifying; and
   playing back the generated new digital content, wherein license conditions of the content parts in the content storage include an automatic replacement permission condition specifying whether to allow replacement of the content part without receiving user instruction, and the specifying includes presenting content parts whose replacement permission condition is replaceable and whose automatic replacement permission condition is impermissible as candidates for the replacement source content part among content parts in the digital content and content parts specified by replacement target specification conditions of the candidates for the replacement source content part as candidates for the replacement target content part, to the user.

4. The method according to claim 3, wherein when replacing the replacement source content part by the replacement target content part, if a content part specified by the complementary relationship condition of certain content part in digital content after the replacing is not contained in the digital content after the replacing, the verifying includes verifying whether there exists in the content storage a content part whose replacement target specification condition specifies the content part specified by the complementary relationship condition of the content part violating complementary relationship condition part and whose automatic replacement permission condition is permissible and if such a content part exists, deciding to replace the content part by the content part specified by the complementary relationship condition.

5. A digital content playback apparatus which plays back first digital content by playing back content parts recorded in an optical disk based on a playback control sequence for controlling playback of the content parts and a first license file including a plurality of license information pieces describing license conditions defined for the content parts, the digital content playback apparatus comprising:
   a reading unit configured to read the playback control sequence, the first license file, identification information of the first digital content, information on a place to obtain a playback control sequence to be edited, and the content parts from the optical disk;
   an editing unit configured to
      access the place shown in the information,
      obtain the playback control sequence to be edited and a second license file including one or more license information pieces describing the license conditions for one or more content parts among the content parts, based on identification information of the playback control sequence and the identification information of the first digital content,
      select content parts which have license information pieces describing a permission of enlisting a link and a condition to permit the link, among the content parts, and
      enlist the link to the selected content parts from the playback control sequence to be edited such that the conditions to permit the link described in the license information pieces of the selected content parts are satisfied;
   storage configured to store the playback control sequence edited by the editing unit and the second license file; and
   a playback unit configured to play back second digital content by playing back content parts based on the playback control sequence edited by the editing unit and the second license file,
   wherein the playback apparatus utilizes further license information describing further license conditions defined for the content parts, each of which includes at least a replacement permission condition and a replacement target specification condition among conditions in which
      the replacement permission condition defines that a content part which has replacement permission is replaceable by another content part, the replacement target specification condition specifies content parts which are replacement target candidates when the replacement permission condition is replaceable, a complementary relationship condition specifies another content part that must be contained in digital content when using the content part which has replacement permission, and an automatic replacement permission condition which specifies whether to allow replacement of the content part which has automatic replacement permission without user instruction, and the playback apparatus presents to the user content parts whose replacement permission condition is replaceable and whose automatic replacement permission condition is impermissible as candidates for a replacement source content part among content parts in the digital content and content parts specified by replacement target specification conditions of the candidates for the replacement source content part as candidates for a replacement target content part.

6. The apparatus according to claim 5, wherein the conditions to permit the enlisting of the link described in the license information pieces of the selected content parts include addresses on the optical disk where the selected content parts exist, and the editing unit enlists the link to the addresses on the optical disk from the play back control sequence to be edited as the link to the selected content parts.

7. The apparatus according to claim 5, wherein the condition to permit the enlisting of a link described in the license information piece of the selected content parts include a condition of adding simultaneously an enlisting of a link to the selected content parts, when the license information piece of the other content parts describes a permission of enlisting a link and a condition to permit the enlisting of the link, the editing unit enlists a link to the address of the other content parts from the playback control sequence to be edited such that the condition to permit the enlisting described in the license information piece of the other parts is satisfied.

8. The apparatus according to claim 7, wherein the address of the other content part is an address on the optical disk, an address on any recording medium or an address of an external server.

9. The apparatus according to claim 7, wherein the condition to permit the enlisting of the link described in the license information piece of the selected content part includes an address on any recording medium or an external server as an address of the other content part and further includes an address indicating a storage location where the other content part is to be stored, and the editing unit
accesses the recording medium or the external server based on the address of the recording medium or the external server to download the other content part and license information piece of the other content part, and when the downloaded license information piece includes a permission of enlisting a link and a condition to permit an enlisting, enlists a link to the address indicating the storage location from the playback control sequence to be edited such that the condition to permit the enlisting of the link described in the license information piece of the other part satisfied and adds the downloaded license information piece to the second license file.

10. The apparatus according to claim 7, wherein the condition to permit the enlisting of the link described in the license information piece of the selected content part specifies an order of playing back the selected content part and the other content part, and the editing unit adds a link to the selected content part and the other content part to the playback control sequence to be edited such that the order of playback is satisfied.

11. The apparatus according to claim 5, wherein the editing unit selects content parts which have license information pieces describing a permission of delisting a link and a condition to permit the delisting of the link among content parts for which a link is enlisted from the playback control sequence edited by the editing unit and delists a link to the selected content parts from the playback control sequence edited by the editing unit such that the conditions to permit the delisting of a link described in the license information pieces of the selected content parts are satisfied.

12. The apparatus according to claim 11 wherein the condition to permit the enlisting of the link or the condition to permit delisting of the link specifies identifiers of one or more playback control sequence to be edited for which enlisting or delisting of a link is permitted, and the editing unit makes the enlisting or delisting of a link only when an identifier of the playback control sequence to be edited or the playback control sequence edited by the editing unit is specified by the condition to permit the enlisting of the link or the condition to permit delisting of the link.

13. The apparatus according to claim 11, wherein the condition to permit delisting of the link includes a condition of enlisting another link and information on other content parts to which the other link is to be enlisted, and when the license information piece on the other content part to which the other link is to be enlisted includes a permission of a link and a condition to permit the link, the editing unit delists a link to the selected content part from the playback control sequence edited by the editing unit and enlists a link to the other content part to the playback control sequence edited by the editing unit such that the condition to permit the link described in the license information piece of the other content part is satisfied.

* * * * *